United States Patent
Izumiya et al.

(10) Patent No.: US 12,528,840 B2
(45) Date of Patent: Jan. 20, 2026

(54) TRANSCRIPTION ACTIVE COMPLEX TARGETING CANCER DRUG FROM VIRAL PROTEIN SEQUENCE

(71) Applicant: The Regents of the University of California, Oakland, CA (US)

(72) Inventors: Yoshihiro Izumiya, Elk Grove, CA (US); Michiko Shimoda, Sacramento, CA (US)

(73) Assignee: The Regents of the University of California, Oakland, CA (US)

( * ) Notice: Subject to any disclaimer, the term of this patent is extended or adjusted under 35 U.S.C. 154(b) by 518 days.

(21) Appl. No.: 18/248,291

(22) PCT Filed: Oct. 21, 2021

(86) PCT No.: PCT/US2021/055979
§ 371 (c)(1),
(2) Date: Apr. 7, 2023

(87) PCT Pub. No.: WO2022/087221
PCT Pub. Date: Apr. 28, 2022

(65) Prior Publication Data
US 2023/0382953 A1    Nov. 30, 2023

Related U.S. Application Data

(60) Provisional application No. 63/222,697, filed on Jul. 16, 2021, provisional application No. 63/152,959, filed on Feb. 24, 2021, provisional application No. 63/094,766, filed on Oct. 21, 2020.

(51) Int. Cl.
*C07K 14/005* (2006.01)
*A61P 35/00* (2006.01)
*C07K 16/18* (2006.01)

(52) U.S. Cl.
CPC ............ *C07K 14/005* (2013.01); *A61P 35/00* (2018.01); *C07K 16/18* (2013.01); *C07K 2317/24* (2013.01); *C07K 2317/622* (2013.01); *C07K 2319/09* (2013.01); *C07K 2319/10* (2013.01); *C07K 2319/33* (2013.01); *C12N 2710/16422* (2013.01); *C12N 2710/16433* (2013.01)

(58) Field of Classification Search
CPC .................................................... C07K 14/005
See application file for complete search history.

(56) References Cited

U.S. PATENT DOCUMENTS

2016/0002668 A1    1/2016    Weinberger

FOREIGN PATENT DOCUMENTS

WO    2014/127148 A1    8/2014
WO    2019/108134 A1    6/2019

OTHER PUBLICATIONS

International Search Report in PCT/US2021/055979, mailed Mar. 9, 2022, 10 pages.
Beaulieu, et al. "Intrinsic cell-penetrating activity propels Omomyc from proof of concept to viable anti-MYC therapy." Science translational medicine 11, No. 484 (2019): eaar5012.
Extended European Search Report in EP 21883870.4 mailed Sep. 16, 2024, 8 pages.
Shimoda, et al. "KSHV transactivator-derived small peptide traps coactivators to attenuate MYC and inhibits leukemia and lymphoma cell growth." Communications biology 4, No. 1 (2021): 1330.

*Primary Examiner* — Suzanne M Noakes
(74) *Attorney, Agent, or Firm* — Kilpatrick Townsend & Stockton LLP

(57) ABSTRACT

The present invention provides compositions and methods for treating a disease involving inappropriate or excessive cell proliferation or for treating an inflammatory condition or an autoimmune disease by inhibiting MYC activity in cells such as MYC-dependent cancer cells.

33 Claims, 24 Drawing Sheets

Specification includes a Sequence Listing.

FIG. 1A KSHV takes over host transcription
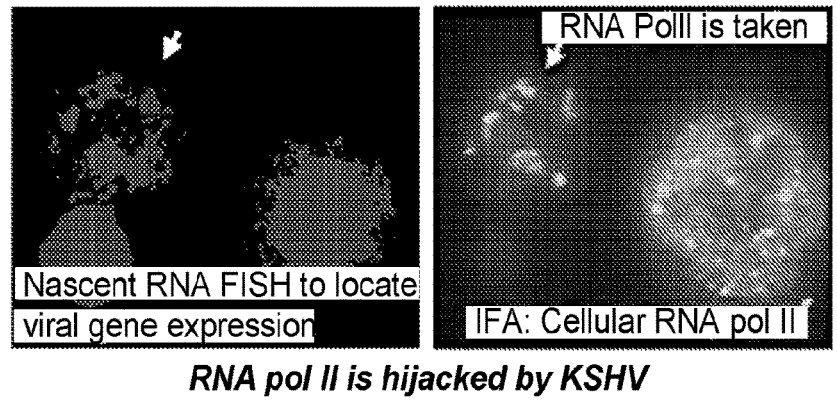
RNA pol II is hijacked by KSHV
FIG. 1B ORF50 expression inhibits MYC activation
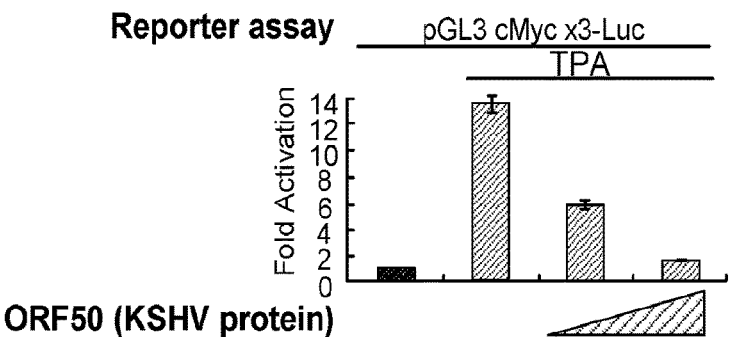
FIG. 1C RNA pol II protein interaction induced by KSHV reactivation on chromatin
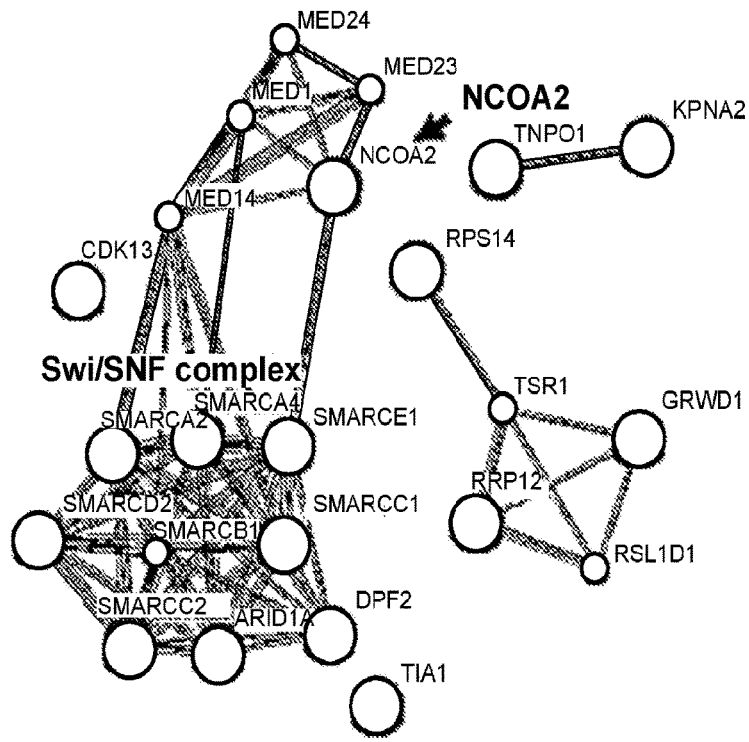

Screening key cellular protein for viral gene expression as readout

Mapping interacting domains

→ NCoA2 localizes on primarily genomic enhancer region.

FIG. 1H
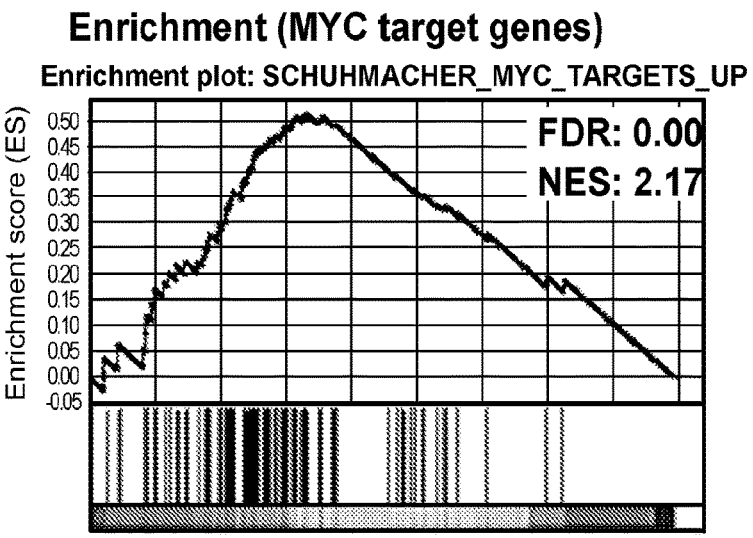
Mut Peptide vs Wt Peptide
→ MYC target genes are down-modulated in Wt peptide treated cells
FIG. 1I
BCBL-1 cells (Primary effusion lymphoma)
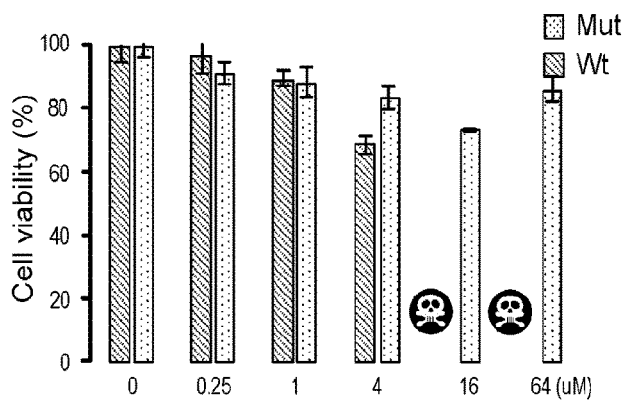
BC-1 cells (Primary effusion lymphoma)
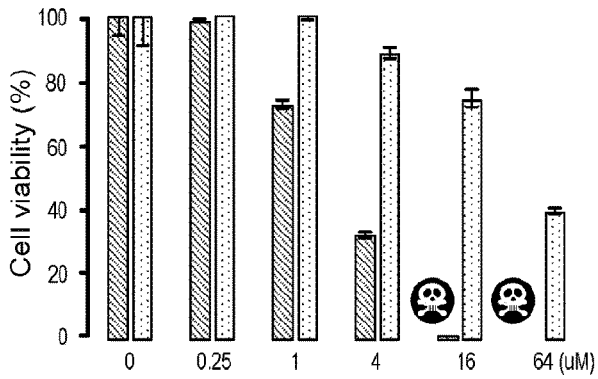

| Other herpesvirus & Bacteria | Alignment/protein seq. |
| --- | --- |
| KSHV ORF50 (K-Rta): | TDDALLSSILQGLYQLDTPPPL |
| LysR Bacteria TF: | LKAQ-LPTILSQGLYQL |
| Saimiriine GHV2: | TDDNILASILQDLYDLPAPP |
| Macaca Nemerha Virus: | TDDDMLAAILQDLYGLQSP |
| Bovine GHV4: | EDAYLELILQGLYHLDEP |
| Retrofibro.GHV: | DDELLSTILQGLYQLDEPP |
| Colobine GHVI: | DEDLLSAILQGLYQLDEPP |

Current our peptide

{d-Arg}KKRR{ORN}RRR{Beta-Ala}-LSSILQGLYQLDT

⟵――――――――――――――⟶ ⟵――――――⟶
Modified TAT peptide for cell penetration KSHV-K-Rta

*Modified C-terminus to increase stability and substituted an amino acid to make "non-natural" counterpart*

Proposing to synthesize and test efficacies in this application

{d-Arg}KKRR{ORN}RRR{Beta-Ala}-LSSILQGLYQL{d-Asp}{d-Thr}
{d-Arg}KKRR{ORN}RRR{Beta-Ala}-LSSILQGLYQL{d-Asp}{d-Ser}
{d-Arg}KKRR{ORN}RRR{Beta-Ala}-LSSILQGLYQL{d-Asp}{d-Glu}
{d-Arg}KKRR{ORN}RRR{Beta-Ala}-LS<u>T</u>ILQGLYQL{d-Asp}{d-Thr}

*FIG. 2*

CD19+ B cells (PBMC 46, 2 x 10^5/well or PBMC 47, 3 x 10^5/well), prepared using magnetic beads isolation kit, were cultured in the presence of IL-4 (50ng/ml) plus stimuli (ODN2006: 1ug/ml, sCD40L: 500 ng/ml) and peptides for 2 days.

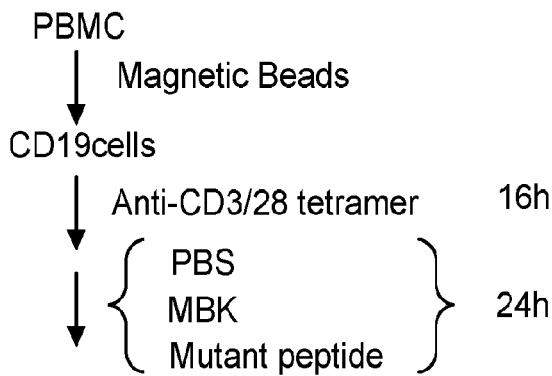
FIG. 5A
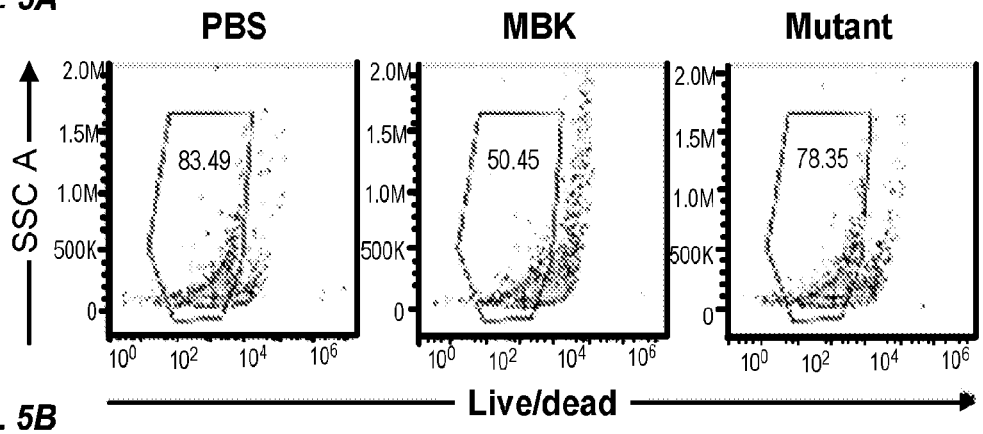
FIG. 5B
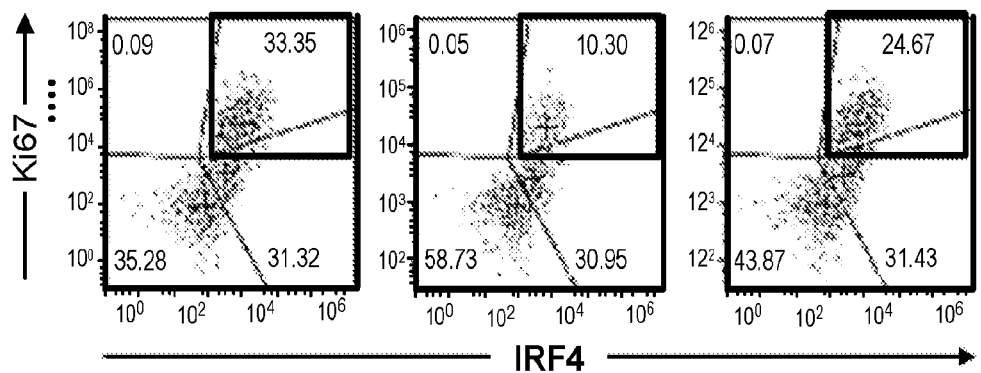

FIG. 5C
Live cells
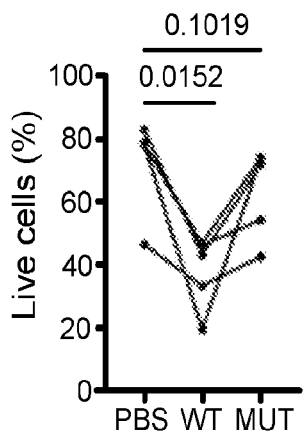
FIG. 5D
Cell count
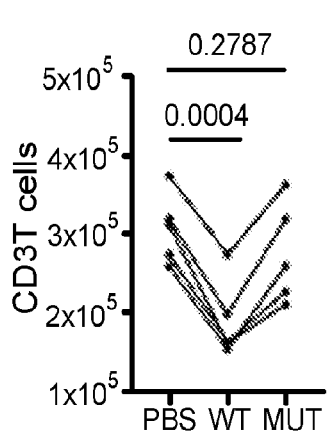
FIG. 5E
Ki67+cells
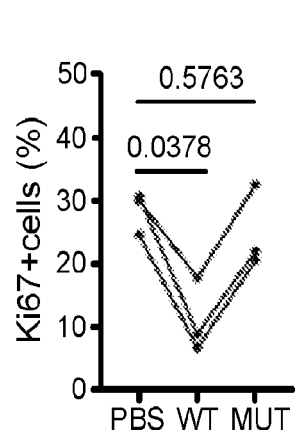
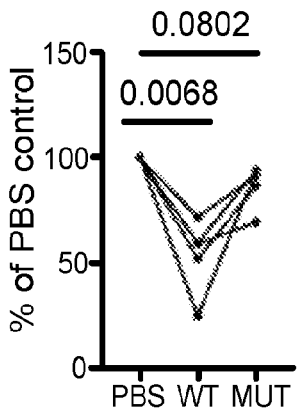
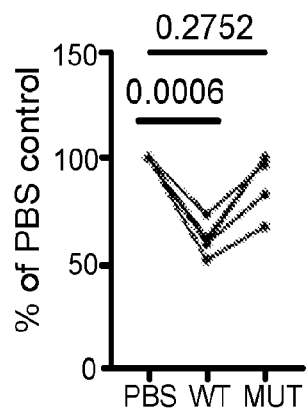
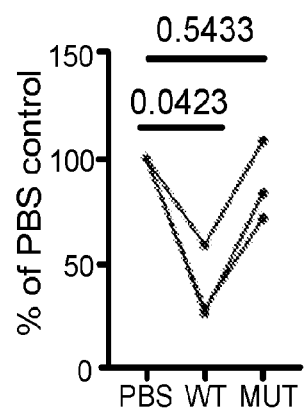
5 healthy donors
3 healthy donors
WT = MBK50 peptide

FIG. 8A

| Other herpesvirus & Bacteria | Alignment/protein seq. |
|---|---|
| KSHV ORF50 (K-Rta): | TDDALLSSILQGLYQLDTPPPL |
| LysR Bacteria TF: | LKAQ-LPTILSQGLYQL |
| Saimiriine GHV2: | TDDNILASILQDLYDLPAPP |
| Macaca Nemerha Virus: | TDDDMLAAILQDLYGLQSP |
| Bovine GHV4: | EDAYLELILQGLYHLDEP |
| Retrofibro.GHV: | DDELLSTILQGLYQLDEPP |
| Colobine GHVI: | DEDLLSAILQGLYQLDEPP |

*Current our peptide*

{d-Arg}KKRR{ORN}RRR{Beta-Ala}-LSSILQGLYQLDT

←——— Modified TAT peptide for cell penetration ———→  ←— KSHV-K-Rta —→

*Modified C-terminus to increase stability and substituted an amino acid to make "non-natural" counterpart*

Proposing to synthesize and test efficacies in this application

{d-Arg}KKRR{ORN}RRR{Beta-Ala}-LSSILQGLYQL{d-Asp}{d-Thr}
{d-Arg}KKRR{ORN}RRR{Beta-Ala}-LSSILQGLYQL{d-Asp}{d-Ser}
{d-Arg}KKRR{ORN}RRR{Beta-Ala}-LSSILQGLYQL{d-Asp}{d-Glu}
{d-Arg}KKRR{ORN}RRR{Beta-Ala}-LSTILQGLYQL{d-Asp}{d-Thr}

FIG. 8B

Legend:
- T->E
- T->S
- S->T
- MBK-Mut
- MBK50-d(1)
- MBK50-d(3)

X-axis: 0, 4, 8, 16, 32, 64 uM
Y-axis: 0.00E+00, 2.0E-01, 4.0E-01, 6.0E-01, 8.0E-01, 1.00E+00, 1.20E+E

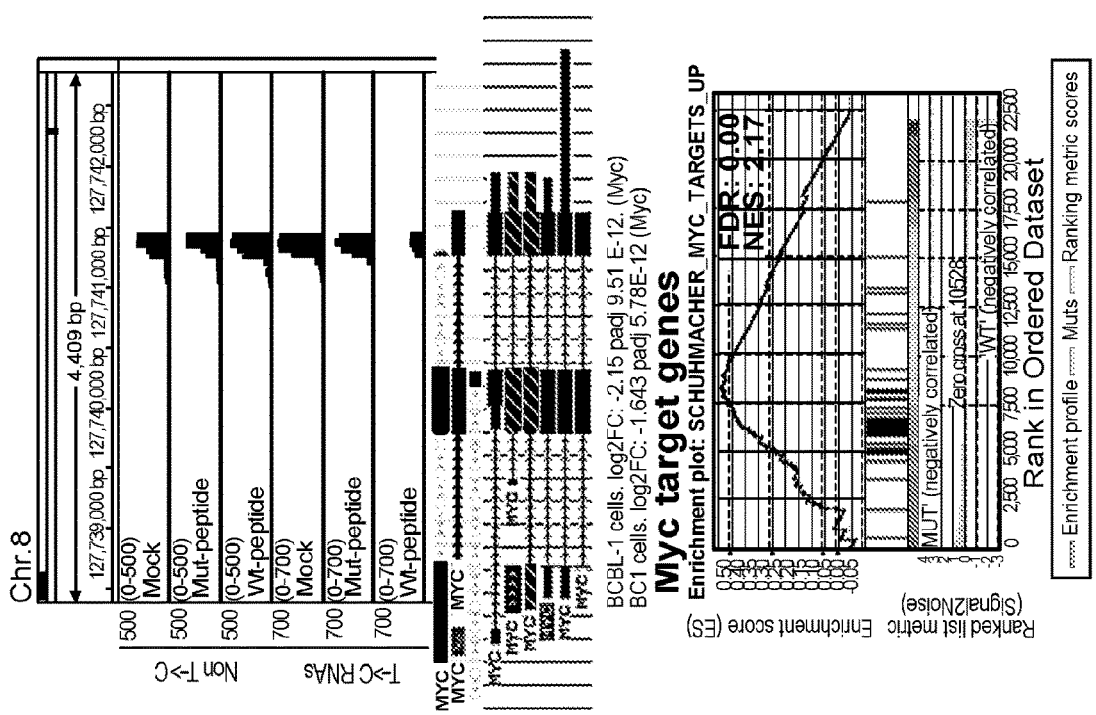
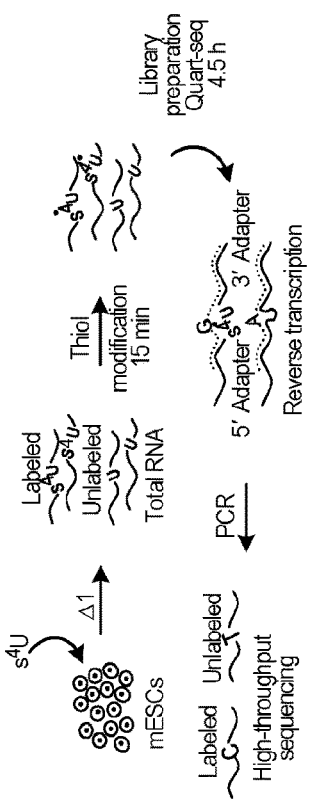
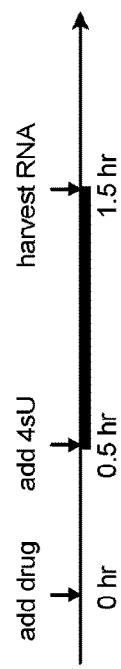
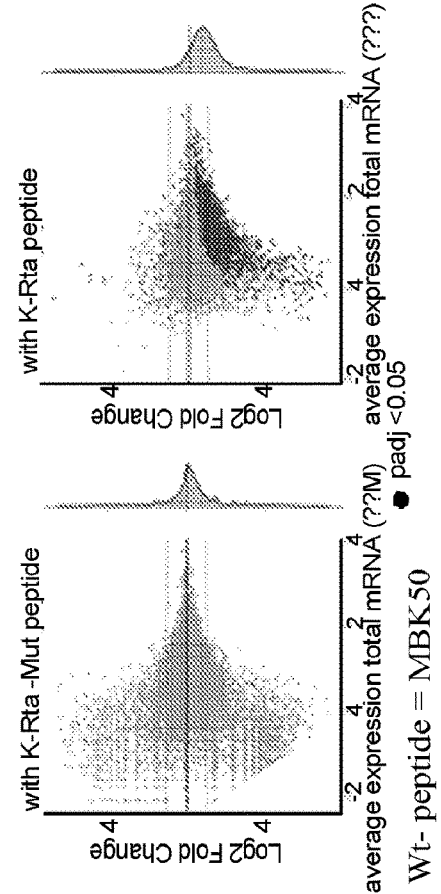
FIG. 9

Monocyte derived DC (MDC)

CD14+ cells

↓ GM-CSF + IL-4 (50ng/ml),
↓ 4 days

MDCs

⎰ PBS
⎨ LPS (100ng/ml)
⎨ Poly I:C (10ug/ml)
⎱ sCD40L (1ug/ml)

⎰ PBS
⎨ MBK
⎱ Mutant peptide

↓ 2 days

CD14+ monocytes (PBMC 46, 2 x 10^5/well or PBMC 47, 2 x 10^5/well), prepared using magnetic beads isolation kit, were cultured in a 96 well U-bottom plate in the presence of stimuli (GMCSF + IL4: 50ng/ml each, PIC-LMW: 2ug/ml, LPS-EB: 100ng/ml) and peptides for 2 days. Representative cell images captured by Keyence microscope (10X).

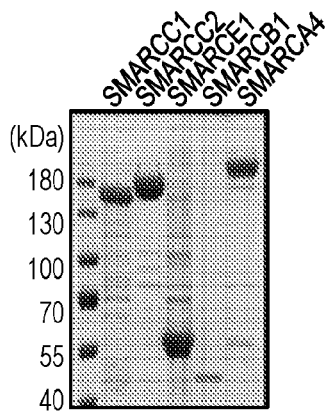
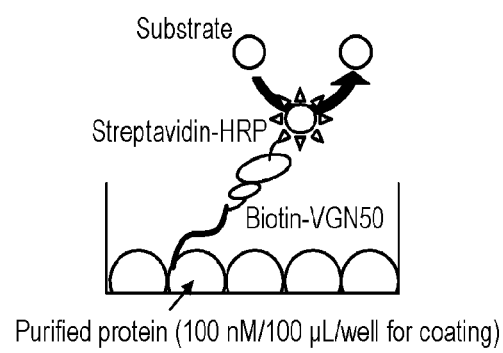
FIG. 17A
FIG. 17B
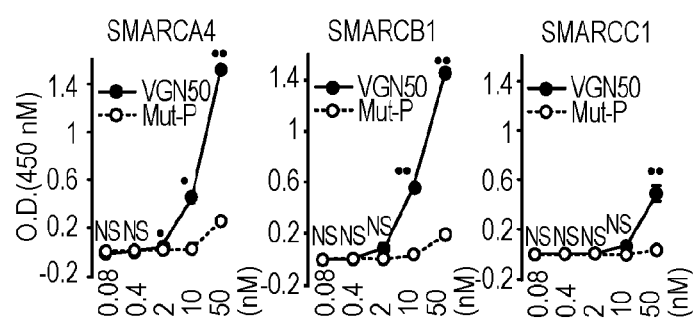
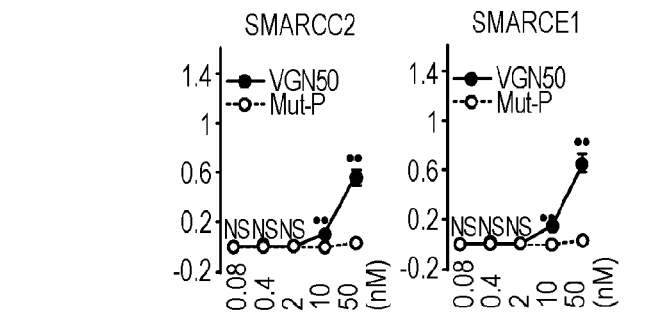
FIG. 17C

TRANSCRIPTION ACTIVE COMPLEX TARGETING CANCER DRUG FROM VIRAL PROTEIN SEQUENCE

RELATED APPLICATIONS

This application is a U.S. National Stage of PCT/US2021/055979, International Filing Date 21 Oct. 2021, which claims priority to U.S. Provisional Patent Application No. 63/094,766, filed Oct. 21, 2020, U.S. Provisional Patent Application No. 63/152,959, filed Feb. 24, 2021, and U.S. Provisional Patent Application No. 63/222,697, filed Jul. 16, 2021, the contents of each of the above are hereby incorporated by reference in the entirety for all purposes.

STATEMENT AS TO RIGHTS TO INVENTIONS MADE UNDER FEDERALLY SPONSORED RESEARCH AND DEVELOPMENT

This invention was made with Government support under grant numbers CA232845 and CA225266 awarded by the National Institutes of Health. The Government has certain rights in the invention.

REFERENCE TO SUBMISSION OF A SEQUENCE LISTING AS A TEXT FILE

The Sequence Listing written in file 081906-1379562-240640US.txt created on Apr. 4, 2023, 4,096 bytes, machine format IBM-PC, MS-Windows operating system, is hereby incorporated by reference in its entirety for all purposes.

BACKGROUND OF THE INVENTION

Viruses hijack host cell machinery for their replication, because they do not encode the necessary enzymes to replicate outside of infected host cells. They are thus molecular wizards, who control cellular functions, which includes cell apoptosis, cell cycle progression, as well as host immune responses. In viral replicating cells, host cell gene expression is frequently turned off, because the host transcriptional apparatus is diverted to transcribe viral genes. By studying which viral protein is responsible for controlling a specific host cell function, unique peptide drugs can be generated based on the viral protein sequence at the surface of the key viral-host protein interaction. Such peptide as well as its variants can be used as a dominant negative to inhibit the protein function.

Cellular c-Myc protein (MYC) is a very important transcriptional factor. It is overexpressed in up to 75% of all cancers, including primary effusion lymphomas (PEL) and multiple myeloma. Despite well-established functions in cancer development and cell proliferation, MYC is considered an "undruggable" target, referring to the fact that, despite significant efforts, the protein has been to this day not pharmacologically actionable. Reasons for the failure to target MYC in a clinically meaningful way include large protein-protein or protein-DNA interaction interfaces, and the unstructured nature of the transcription factor in general. As a result, constructing a molecule to modulate the function of MYC is one of the key challenges for cancer research (1). Finding possible drug(s) that can modulate MYC function and therefore inhibits cancer cell growth or even kills MYC-addicted cancer cells, should have a significant impact scientifically and clinically.

There are currently approximately 70 approved peptides and over 150 additional peptides in active development in the areas of metabolic disease, oncology, and cardiovascular disease (2). A few of them are investigative peptide drugs that are targeting MYC. One candidate MYC targeting peptide drug is OmoMyc (3), from Peptomyc; it is currently in Phase I/II clinical trial. OmoMyc mimics the bHLH-Zip domain of MYC by incorporating four point mutations (E63T, E70I, R77Q, R78N) in the leucine zipper region and thus acts in a dominant negative fashion and inhibits transcriptional activation of specific target genes. Although it is billed as a peptide drug, OmoMyc is relatively large and consists of 92 amino acids. Because of the size, OmoMyc on its own displays poor delivery across physiological barriers to the desired cellular compartment and thus, the therapeutic use of OmoMyc has been impaired by the lack of tumor cell penetration in vivo.

There is therefore a need for new, safe, and effective treatments for targeting MYC to regulate the proliferation or activation of cells, especially cancer cells as well as lymphoid cells such as B and T cells. The present disclosure addresses this need and provides other advantages as well.

BRIEF SUMMARY OF THE INVENTION

In the first aspect, the present invention provides a polypeptide comprising a MYC-inhibiting peptide and one or more heterologous amino acid sequences. The MYC-inhibiting peptide comprises the amino acid sequence set forth in SEQ ID NO:4, is no more than about 100 amino acids in length, and inhibits MYC activity in a cell, especially a cancer cell. For instance, the MYC-inhibiting peptide may be no longer that about 15, 20, 25, 30, 35, 40, 45, 50, 55, 60, 70, 80 or 90 amino acids. Further, the MYC-inhibiting peptide can be identified and screened for based on its ability to bind NCoA2 protein and/or to bind the SWI/SNF complex. In some embodiments, the MYC-inhibiting peptide comprises the amino acid sequence set forth in SEQ ID NO:1 and an additional peptide, preferably a heterologous peptide, such as a TAT sequence. In some embodiments, the MYC-inhibiting peptide consists of the amino acid sequence set forth in SEQ ID NO:1. In some cases, the polypeptide of this invention includes one or more D-amino acids, which may be located in the MYC-inhibiting peptide or the heterologous peptide(s). In some embodiments, the heterologous peptide is an antibody or an antigen-binding fragment thereof, for example, capable of specifically recognizing an antigen, such as a cell surface antigen naturally present on certain cell type of interest (e.g., cancer cells). In some embodiments, the antibody is a single chain antibody and/or is humanized. In some embodiments, the antigen recognized by the antibody is a cell surface antigen, such as one located on the surface of a MYC-dependent tumor cell. In some embodiments, the MYC-inhibiting peptide and the antibody or fragment are connected by a peptide linker, which in some cases includes one or more protease cleavage sites. In some embodiments, the polypeptide further includes a nuclear localization signal and/or a signal peptide at the N-terminus.

In some embodiments, the MYC-inhibiting peptide is a 13-amino-acid peptide, which as the activity of inhibiting MYC activity in a cell, especially a cancer cell. The peptide comprises the amino acid sequence of set forth in the conserved sequence SEQ ID NO:4. For example, the exemplary MYC-inhibiting peptide SEQ ID NO:1 may be modified according to at least one, possibly two or more, of the following possibilities: (a) at least one of the 13 amino acids is a D-amino acid; (b) the amino acid sequence of the peptide differs from SEQ ID NO:1 at position 3 or 13, with possible modification such as substitution, addition, and/or deletion; or (c) the peptide is conjugated with a heterologous moiety attached to one or more amino acids within the peptide.

In some embodiments, the peptide has D-amino acid(s) at position 12 and/or position 13 of SEQ ID NO:1. In some embodiments, the heterologous moiety is a TAT peptide. For example, the TAT peptide and the MYC-inhibiting peptide are present within the same polypeptide chain, e.g., in the form of a fusion protein. An exemplary TAT peptide comprises or consists of the amino acid sequence of SEQ ID NO:2 or SEQ ID NO:3.

In some embodiments, the peptide is conjugated with an antibody or an antibody fragment. For example, the antibody fragment is a single chain antibody such as a ScFv. In some embodiments, the peptide and the antibody (e.g., a single chain antibody) or antibody fragment are present within a single polypeptide chain as a fusion protein. In some embodiments, the antibody or antibody fragment is humanized. In some embodiments, the antibody or antibody fragment specifically recognizes or with a binding affinity for an antigen on a MYC-dependent tumor cell.

In some embodiments, the peptide of this invention has a threonine at position 3 of SEQ ID NO:1. In some embodiments, the peptide of this invention has a serine or glutamic acid at position 13 of SEQ ID NO:1. In some embodiments, the peptide of SEQ ID NO:1 or derived from SEQ ID NO:1 is linked with the heterologous moiety by a chemical linker. In some embodiments, the peptide of this invention further includes a nuclear localization signal. In some embodiments, the peptide of SEQ ID NO:1 or derived from SEQ ID NO:1 is linked with a polypeptide heterologous moiety by a cleavable peptide linker such as a linker containing one or more serine protease cleavage sites. In some embodiments, the peptide of this invention has a cysteine residue at the C-terminus. In some embodiments, the peptide of this invention has a signal peptide at the N-terminus.

In some embodiments, the heterologous moiety comprises a protein of a viral origin, such as a viral capsid protein (for example, an adenovirus or adeno-associated virus (AAV) or hepatitis E virus (HEV) capsid protein) or a portion thereof permitting formation of a virus-like particle (VLP). See, e.g., Büning and Srivastava, *Mol Ther Methods Clin Dev.* 12: 248-265 (2019); Le, et al., *Sci Rep* 9, 18631 (2019): U.S. Pat. No. 8,906,862; WO2019/178288; WO2019/236870. In other embodiments, the heterologous moiety comprises a virus (e.g., an adeno virus or AAV) or a VLP that contains a therapeutic DNA molecule, a therapeutic RNA molecule, a small molecule therapeutic agent, or any combination thereof.

In a second aspect, the present invention provides a nucleic acid comprising the polynucleotide sequence encoding the peptide of this invention in the form of a MYC-inhibiting peptide or in the form of a fusion protein, such as a peptide fitting the consensus sequence of SEQ ID NO:4, comprising or consisting of the amino acid sequence of SEQ ID NO:1, optionally with one or more residues modified (e.g., substituted, deleted, or added), or a fusion protein between a MYC-inhibiting peptide and a second peptide derived from a heterologous origin.

In a third aspect, the present invention provides an expression cassette comprising a polynucleotide sequence encoding a MYC-inhibiting peptide or a fusion protein described above and herein, operably linked to a promoter, especially a heterologous promoter. Also provided is a vector comprising the polynucleotide sequence or the expression cassette. A host cell comprising the above-described nucleotide sequence encoding a MYC-inhibiting peptide or its fusion protein, a vector or an expression cassette comprising the nucleotide sequence, is also provided. In some cases, the host cell contains the MYC-inhibiting peptide or fusion protein.

In a related aspect, the present invention also provides a composition comprising a physiologically or pharmaceutically acceptable carrier or excipient along with the peptide or peptide conjugate such as fusion protein of this invention, or a nucleic acid comprising a polynucleotide sequence encoding the peptide or fusion protein, an expression cassette, or a vector comprising the coding sequence. In some embodiments, the composition comprising a physiologically or pharmaceutically acceptable carrier or excipient along with a host cell comprising the fusion protein of this invention, a nucleic acid comprising a polynucleotide sequence encoding the peptide or fusion protein, or an expression cassette or a vector comprising the coding sequence for the peptide or fusion protein.

In a fourth aspect, the present invention provides a method for inhibiting MYC activity in a cell, especially a cell with overexpressed MYC or otherwise enhanced MYC activity such as a cancer cell, or for inhibiting a lymphoproliferative, an immune, or an inflammatory response such as an autoimmune disease involving inappropriately activated B or T cells. In some embodiments, it provides a means to deplete the MYC-dependent expansion or function of undesired cells such as T regulatory cells in cancers. The method includes the step of contacting the cell with an effective amount of the peptide of the present invention including the fusion protein and peptide conjugate as described above and herein. In the alternative, the method includes the step of contacting the cell with an effective amount of a nucleic acid (such as an expression cassette or vector) encoding the peptide of the present invention including the fusion protein as described above and herein. In some embodiments, the present invention provides a method of treating a MYC-dependent cancer or for treating a lymphoproliferative, inflammatory, or immune disorder in a subject by administering to the subject an effective amount of the peptide of the present invention including the fusion protein and peptide conjugate as described above and herein. In some embodiments, it provides a means to inhibit the MYC-dependent expansion or function of undesired suppressor cells such as T regulatory cells in the patients of cancers. In some embodiments, a lymphoproliferative, inflammatory, or immune disorder such as an autoimmune disease especially one mediated by inappropriately activated B or T cells. In the alternative, the method includes the step of administering to the subject an effective amount of a nucleic acid (such as an expression cassette or vector) encoding the peptide of the present invention including the fusion protein as described above and herein or an effective amount of the pharmaceutical composition described above and herein. In some embodiments, the cancer is a primary effusion lymphoma (PEL).

BRIEF DESCRIPTION OF THE DRAWINGS

FIGS. 1A-H. Viral protein sequence based cancer drug. (FIG. 1A) Discovery of hijacking transcription machinery in KSHV reactivating cells (Chen et al., *J. Virol* 2017). Nascent RNA-FISH along with IFA shows accumulation of cellular RNA polymerase II at the site of viral gene transcription. (FIG. 1B) Reporter assay. KSHV ORF50 overexpression inhibits MYC activation. (FIG. 1C) Chromatin immunoprecipitation with Mass Spectrometry. Proteins inducibly interact with both ORF50 and RNA polII are shown. (FIG. 1D)

Knocking-down of individual interacting molecules showed NCoA2 as a critical molecule for KSHV gene expression. (FIG. 1E) Mapping of interacting domain. GST-pull down was performed to identify NCoA2 binding domains. Purified NCoA2 was made from recombinant baculovirus infected cells and KSHV ORF50 deletion proteins were made in *E. coli*. Peptides are then generated as TAT-fusion for cell penetration. (FIG. 1F) ChIP-seq and RNA-seq. ChIP-seq was performed to identify NCOA2 target genes in primary effusion lymphoma cells. NCoA2 localization is highly associated with active genes and localizes with RNA pol II at enhancer regions. (FIG. 1G) Down modulation of MYC expression by wild-type peptide. The qRT-PCR was performed with specific primers. (FIG. 1H) Gene set enrichment analyses (GSEA). RNA sequencing was performed with peptide-treated PEL cells. GSEA analyses showed significant enrichment of MYC target genes with false discovery rate as 0. Three PEL cell lines (BCBL-1, BC3, and BC1) showed similar enrichment scores as MYC target gene sets as the highest score. (FIG. 1I) The peptide drug. Wt peptide or mutant peptide was incubated in culture media. Forty-eight hours later, live cells were measured by applying MTS. Cell viability was compared with no-treated samples. No treated sample was set as 1.

FIG. 2. Non-limiting examples of amino acid substitutions. Key protein elements were conserved in other gamma-herpesviral homologs. Our current peptide is shown in the middle and proposed substitutions of amino acids are marked in red. In vitro and in vivo experiments are repeated with new peptides and also improvement made with the changes in stability (PK/PD) and tumor killing effects (PEL xenograft model) are examined. The seven peptides from the Alignment/protein seq. table are presented in order of appearance as SEQ ID NOs: 6-12, respectively.

FIGS. 5(A)-(E). Effect on CD3+ T cell proliferation in response to anti-CD3 stimulation.

FIG. 6. Viral and cellular responses to K-Rta peptide; identification of VGN50. (a) Protein sequence alignment.

FIG. 8. Amino acid conservation among different gamma-herpesviral transactivator proteins. Different mutant peptides that have cancer inhibitory function were identified. The seven peptides from the Alignment/protein seq. table are presented in order of appearance as SEQ ID NOs: 6-12, respectively. Essential protein motif and switchable residues are marked in red (a). Effects of non-natural mutant peptides on cancer growth (b) d-3: replaced three L-amino acids into D-amino. DE; D substitute to glutamic acid, DS: D substituted for serine. ST; serine substituted for threonine (marked in red).

FIG. 9. Profiling Peptide targets with Thiol(SH)-linked alkylation for the metabolic sequencing of RNA (SLAM seq). Differences in active transcription in presence of peptide drug was examined. Peptide drugs strongly inhibited active transcription in both BCBL-1 and BC1. Myc transcription was strongly down-regulated in presence of peptide drug. Total RNA-sequence performed 24 hours after drug incubation. Gene Set Enrichment Analyses (GSEA) demonstrated down-modulation of MYC pathway.

FIG. 13. Effect of MBK50 on CD14+ monocytes.

FIG. 16. Effect of MBK50 on MYC and IRF4 expression in LPS-activated monocytic leukemia cell line THP-1 cells. THP-1 cells were cultured with LPS (100 ng/ml) in the presence of 8 μM of MBK50, mutant control, or PBS for 24 hours. MYC and IRF4 expression levels were examined by intracellular staining of MYC and IRF4 with isotype control staining followed by flow cytometry.

FIG. 17(a) SDS-PAGE analysis of five SWI/SNF components individually prepared from baculovirus infected Sf9 cells. FIG. 17(b) A schematic illustration of ELISA assay to evaluate VGN50 and SWI/SNF interaction. FIG. 17(c) Analysis of VGN50 binding to SWI/SNF components by ELISA. Peptide binding measured as OD values at 450 nm are shown. Mean OD values were compared between the VGN50 and Mut-P in each concentration using unpaired t-test. **p<0.01, *p<0.05, NS: no significance. Data are presented as mean±SD.

DETAILED DESCRIPTION OF THE INVENTION

1. Introduction

Figure 1D:
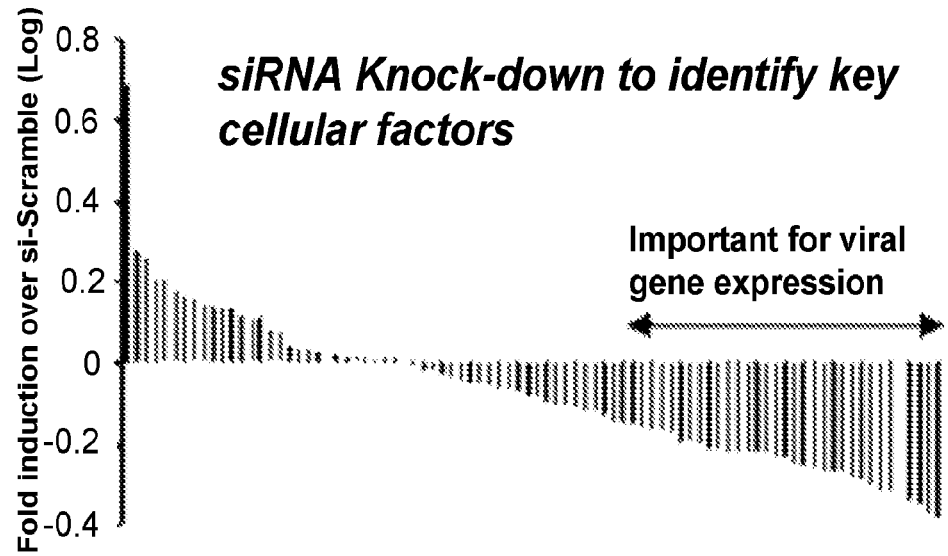
Figure 1E:
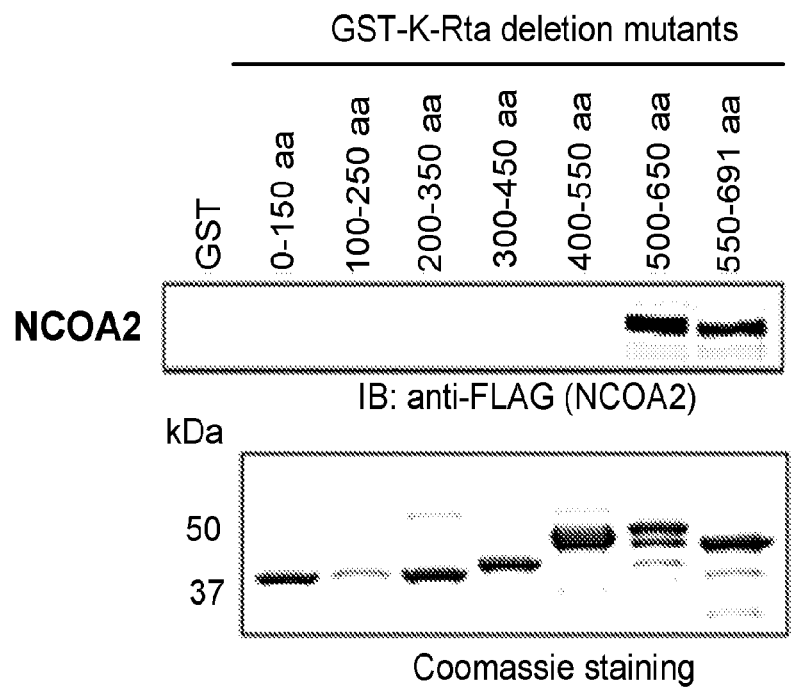
Figure 1F:
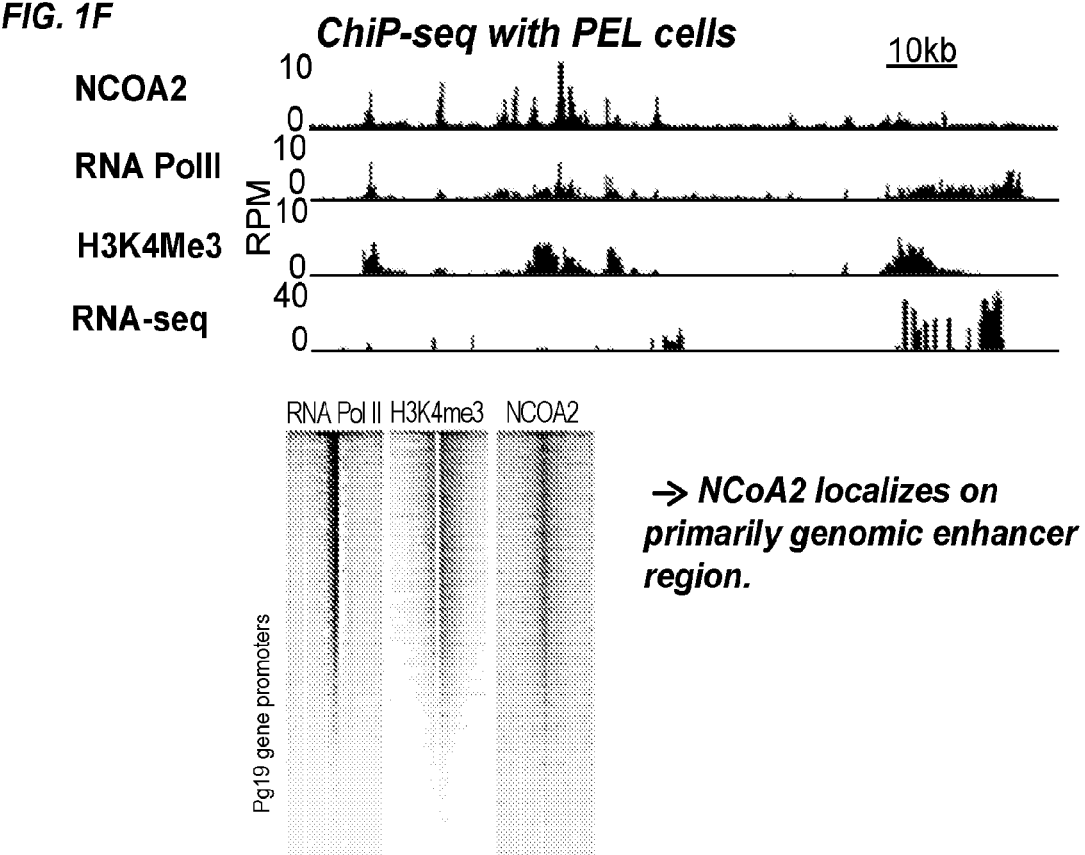
Figure 1G:
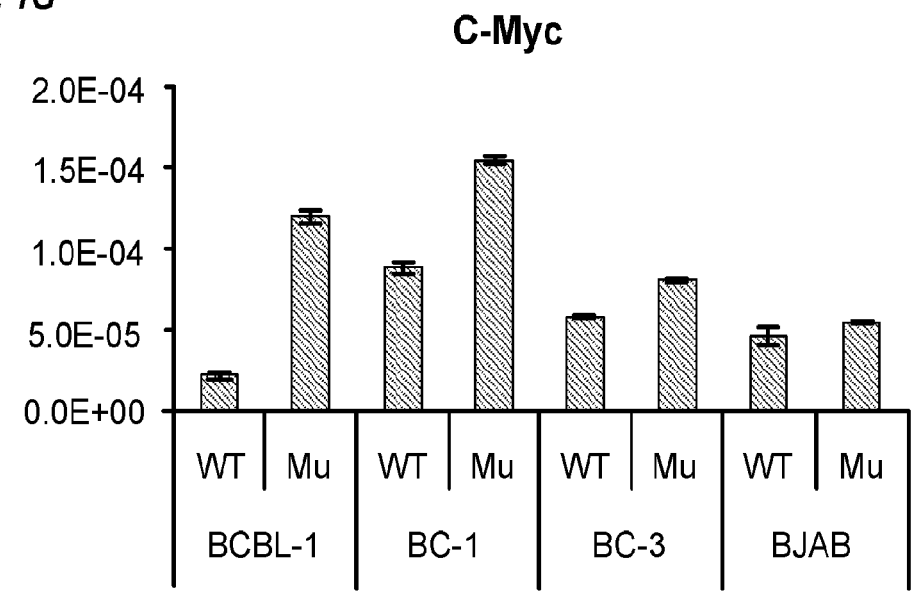

The present disclosure provides methods and compositions for inhibiting MYC activity in proliferating cells, e.g., cancer cells and lymphoid cells such as B or T cells. The present disclosure is based on the surprising discovery that a modified peptide derived from the Kaposi's sarcoma-associated herpesvirus (KSHV) can effectively inhibit MYC activity in cells such as cancer cells. Inhibiting MYC activity in MYC-dependent cancer cells can inhibit the growth of the cells and, in some cases, kill the cells. Without being bound by any particular theory, it is believed that the peptide inhibits MYC activity by acting as a decoy to block the recruitment of coactivator complexes consisting of nuclear receptor coactivator 2 (NCOA2), p300, and SWI/SNF proteins to the MYC promoter for MYC expression and transactivation.

In different embodiments of the invention, the peptides used to inhibit MYC activity in proliferating cells (such as cancer cells and lymphoid cells) are modified in any of various ways. For example, in some embodiments, the peptides comprise substitutions of one or more amino acids of the peptide with D-amino acids. In some embodiments, the peptides comprise one or more amino acid differences relative to SEQ ID NO:1. In some embodiments, the peptides comprise a heterologous moiety including but not limited to a detectable moiety, a substrate (for example, acting as a solid support), a peptide of another origin (not from the same protein of which SEQ ID NO:1 is a segment) such as a cell penetrating peptide (CPP) or an antibody that has been linked to the peptide. In addition, the peptides may be chemically modified at one or more amino acid residues to optimize the peptides' properties such as solubility, stability, and bioavailability to enhance their effectiveness and/or application ranges. For example, the peptides may be modified by glycosylation and PEGylation. Methods of using the peptides to inhibit MYC activity in a cell are provided, as are methods of inhibiting the growth of MYC-expressing cancer cells or lymphoid cells and methods of treating a subject with a MYC-associated cancer or an inflammatory disorder such as an autoimmune disease.

2. Definitions

As used herein, the following terms have the meanings ascribed to them unless specified otherwise.

The terms "a," "an," or "the" as used herein not only include aspects with one member, but also include aspects with more than one member. For instance, the singular forms "a," "an," and "the" include plural referents unless the context clearly dictates otherwise. Thus, for example, reference to "a cell" includes a plurality of such cells and reference to "the agent" includes reference to one or more agents known to those skilled in the art, and so forth.

The terms "about" and "approximately" as used herein shall generally mean an acceptable degree of error for the quantity measured given the nature or precision of the measurements. Typically, exemplary degrees of error are within 20 percent (%), preferably within 10%, and more preferably within 5% of a given value or range of values. Any reference to "about X" specifically indicates at least the values X, 0.8X, 0.81X, 0.82X, 0.83X, 0.84X, 0.86X, 0.87X, 0.88X, 0.89X, 0.9X, 0.91X, 0.92X, 0.93X, 0.94X, 0.95X, 0.96X, 0.97X, 0.99X, 1.01X, 1.02X, 1.03X, 1.04X, 1.05X, 1.06X, 1.07X, 1.08X, 1.09X, 1.1X, 1.11X, 1.12X, 1.13X, 1.14X, 1.15X, 1.16X, 1.17X, 1.18X, 1.19X, and 1.2X. Thus, "about X" is intended to teach and provide written description support for a claim limitation of, e.g., "0.98X."

The term "nucleic acid sequence encoding a peptide" refers to a segment of DNA, which in some embodiments may be a gene or a portion thereof, that is involved in producing a peptide chain (e.g., an antigen or fusion protein). A gene will generally include regions preceding and following the coding region (leader and trailer) involved in the transcription/translation of the gene product and the regulation of the transcription/translation. A gene can also include intervening sequences (introns) between individual coding segments (exons). Leaders, trailers, and introns can include regulatory elements that are necessary during the transcription and the translation of a gene (e.g., promoters, terminators, translational regulatory sequences such as ribosome binding sites and internal ribosome entry sites, enhancers, silencers, insulators, boundary elements, replication origins, matrix attachment sites and locus control regions, etc.). A "gene product" can refer to either the mRNA or protein expressed from a particular gene.

The terms "expression" and "expressed" refer to the production of a transcriptional and/or translational product, e.g., of a nucleic acid sequence encoding a protein (e.g., an antigen or fusion protein). In some embodiments, the term refers to the production of a transcriptional and/or translational product encoded by a gene (e.g., a gene encoding an antigen) or a portion thereof. The level of expression of a DNA molecule in a cell may be assessed on the basis of either the amount of corresponding mRNA that is present within the cell or the amount of protein encoded by that DNA produced by the cell.

The term "recombinant" when used in reference, e.g., to a polynucleotide, protein, vector, or cell, indicates that the polynucleotide, protein, vector, or cell has been modified by the introduction of a heterologous nucleic acid or protein or the alteration of a native nucleic acid or protein, or that the cell is derived from a cell so modified. For example, recombinant polynucleotides contain nucleic acid sequences that are not found within the native (non-recombinant) form of the polynucleotide.

As used herein, the terms "polynucleotide" and "nucleic acid" refer to deoxyribonucleic acids (DNA) or ribonucleic acids (RNA) and polymers thereof. The term includes, but is not limited to, single-, double-, or multi-stranded DNA or RNA, genomic DNA, cDNA, and DNA-RNA hybrids, as well as other polymers comprising purine and/or pyrimidine bases or other natural, chemically modified, biochemically modified, non-natural, synthetic, or derivatized nucleotide bases. Unless specifically limited, the term encompasses nucleic acids containing known analogs of natural nucleotides that have similar binding properties as the reference nucleic acid. Unless otherwise indicated, a particular nucleic acid sequence also implicitly encompasses conservatively modified variants thereof (e.g., degenerate codon substitutions), homologs, and complementary sequences as well as the sequence explicitly indicated. Specifically, degenerate codon substitutions may be achieved by generating sequences in which the third position of one or more selected (or all) codons is substituted with mixed-base and/or deoxyinosine residues (Batzer et al., *Nucleic Acid Res.* 19:5081 (1991); Ohtsuka et al., *J. Biol. Chem.* 260:2605-2608 (1985); and Rossolini et al., *Mol. Cell. Probes* 8:91-98 (1994)).

The terms "vector" and "expression vector" refer to a nucleic acid construct, generated recombinantly or synthetically, with a series of specified nucleic acid elements that permit transcription of a particular nucleic acid sequence (e.g., encoding an antigen and/or fusion protein of the invention) in a host cell or engineered cell. In some embodiments, a vector includes a polynucleotide to be transcribed, operably linked to a promoter. Other elements that may be present in a vector include those that enhance transcription (e.g., enhancers), those that terminate transcription (e.g., terminators), those that confer certain binding affinity or antigenicity to a protein (e.g., recombinant protein) produced from the vector, and those that enable replication of the vector and its packaging (e.g., into a viral particle). In some embodiments, the vector is a viral vector (i.e., a viral genome or a portion thereof). A vector may contain nucleic acid sequences or mutations, for example, that increase tropism and/or modulate immune function. An "expression cassette" comprises a coding sequence, operably linked to a promoter, and optionally a polyadenylation sequence.

The terms "polypeptide," "peptide," and "protein" are used interchangeably herein to refer to a polymer of amino acid residues. All three terms apply to amino acid polymers in which one or more amino acid residues are an artificial chemical mimetic of a corresponding naturally occurring amino acid, as well as to naturally occurring amino acid polymers and non-naturally occurring amino acid polymers. As used herein, the terms encompass amino acid chains of any length, including full-length proteins, wherein the amino acid residues are linked by covalent peptide bonds.

The terms "subject," "individual," and "patient" are used interchangeably herein to refer to a vertebrate, preferably a mammal, more preferably a human. Mammals include, but are not limited to, rodents (mice, rats, etc.), felines, bovines, simians, primates (including humans), farm animals, sport animals, and pets. Tissues, cells and their progeny of a biological entity obtained in vivo or cultured in vitro are also encompassed.

As used herein, the term "administering" includes oral administration, topical contact, administration as a suppository, intravenous, intraperitoneal, intramuscular, intralesional, intratumoral, intrathecal, intranasal, intraosseous, or subcutaneous administration to a subject. Administration is by any route, including parenteral and transmucosal (e.g., buccal, sublingual, palatal, gingival, nasal, vaginal, rectal, or transdermal). Parenteral administration includes, e.g., intravenous, intramuscular, intra-arterial, intradermal, subcutaneous, intraperitoneal, intraventricular, intraosseous, and intracranial. Other modes of delivery include, but are not limited to, the use of liposomal formulations, intravenous infusion, transdermal patches, etc.

The term "treating" refers to an approach for obtaining beneficial or desired results including, but not limited to, a therapeutic benefit and/or a prophylactic benefit. "Therapeutic benefit" means any therapeutically relevant improvement in or effect on one or more diseases, conditions, or symptoms under treatment. Therapeutic benefit can also mean to effect a cure of one or more diseases, conditions, or symptoms under treatment. Furthermore, therapeutic benefit can also mean to increase survival. For prophylactic benefit, the compositions may be administered to a subject at risk of developing a particular disease, condition, or symptom, or to a subject reporting one or more of the physiological symptoms of a disease, even though the disease, condition, or symptom may not yet be present.

The term "therapeutically effective amount" or "sufficient amount" refers to the amount of a system, recombinant polynucleotide, or composition described herein that is sufficient to effect beneficial or desired results. The therapeutically effective amount may vary depending upon one or more of: the subject and disease condition being treated, the weight and age of the subject, the severity of the disease condition, the immune status of the subject, the manner of administration and the like, which can readily be determined by one of ordinary skill in the art. The specific amount may vary depending on one or more of: the particular agent chosen, the target cell type, the location of the target cell in the subject, the dosing regimen to be followed, whether it is administered in combination with other compounds, timing of administration, and the physical delivery system in which it is carried.

For the purposes herein an effective amount is determined by such considerations as may be known in the art. The amount must be effective to achieve the desired therapeutic effect in a subject suffering from a disease such as an infectious disease or cancer. The desired therapeutic effect may include, for example, amelioration of undesired symptoms associated with the disease, prevention of the manifestation of such symptoms before they occur, slowing down the progression of symptoms associated with the disease, slowing down or limiting any irreversible damage caused by the disease, lessening the severity of or curing the disease, or improving the survival rate or providing more rapid recovery from the disease. Further, in the context of prophylactic treatment the amount may also be effective to prevent the development of the disease.

The term "pharmaceutically acceptable carrier" refers to a substance that aids the administration of an active agent to a cell, an organism, or a subject. "Pharmaceutically acceptable carrier" also refers to a carrier or excipient that can be included in the compositions of the invention and that causes no significant adverse toxicological effect on the patient. Non-limiting examples of pharmaceutically acceptable carriers include water, sodium chloride (NaCl), normal saline solutions, lactated Ringer's, normal sucrose, normal glucose, binders, fillers, disintegrants, lubricants, coatings, sweeteners, flavors and colors, liposomes, dispersion media, microcapsules, cationic lipid carriers, isotonic and absorption delaying agents, and the like. The carrier may also comprise or consist of substances for providing the formulation with stability, sterility and isotonicity (e.g. antimicrobial preservatives, antioxidants, chelating agents and buffers), for preventing the action of microorganisms (e.g. antimicrobial and antifungal agents, such as parabens, chlorobutanol, phenol, sorbic acid and the like) or for providing the formulation with an edible flavor, etc. In some instances, the carrier is an agent that facilitates the delivery of a polypeptide, fusion protein, or polynucleotide to a target cell or tissue. One of skill in the art will recognize that other pharmaceutical carriers are useful in the present invention.

The phrase "specifically binds" refers to a molecule (e.g., an antibody or antibody fragment against a cancer cell antigen) that binds to a target with greater affinity, avidity, more readily, and/or with greater duration to that target in a sample than it binds to a non-target compound. In some embodiments, a molecule that specifically binds a target binds to the target with at least 2-fold greater affinity than non-target compounds, e.g., at least 3-fold, 4-fold, 5-fold, 6-fold, 7-fold, 8-fold, 9-fold, 10-fold, 20-fold, 25-fold, 50-fold or greater affinity.

As used in herein, the terms "identical" or percent "identity," in the context of describing two or more polynucleotide or amino acid sequences, refer to two or more sequences or specified subsequences that are the same. Two sequences that are "substantially identical" have at least 60% identity, preferably 65%, 70%, 75%, 80%, 85%, 90%, 91%, 92%, 93, 94%, 95%, 96%, 97%, 98%, 99%, or 100% identity, when compared and aligned for maximum correspondence over a comparison window, or designated region as measured using a sequence comparison algorithm or by manual alignment and visual inspection where a specific region is not designated. With regard to polynucleotide sequences, this definition also refers to the complement of a test sequence. With regard to amino acid sequences, in some cases, the identity exists over a region that is at least about 50 amino acids or nucleotides in length, or more preferably over a region that is 75-100 amino acids or nucleotides in length.

For sequence comparison, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Default program parameters can be used, or alternative parameters can be designated. The sequence comparison algorithm then calculates the percent sequence identities for the test sequences relative to the reference sequence, based on the program parameters. For sequence comparison of nucleic acids and proteins, the BLAST 2.0 algorithm and the default parameters are used.

The term "heterologous" as used in the context of describing the relative location of two elements, refers to the two elements such as polynucleotide sequences (e.g., a promoter or a protein/polypeptide-encoding sequence) or polypeptide sequences (e.g., SEQ ID NO:1 and another peptide sequence serving as a fusion partner with SEQ ID NO:1 in a conjugate in the form of a fusion polypeptide) that are not naturally found in the same relative positions. Thus, a "heterologous promoter" of a gene refers to a promoter that is not naturally operably linked to that gene. Similarly, a "heterologous polypeptide" or "heterologous polynucleotide" to SEQ ID NO:1 or its encoding sequence is one derived from an origin different from the protein of which SEQ ID NO:1 is a naturally-occurring fragment. The fusion of SEQ ID NO:1 (or its coding sequence) with a heterologous polypeptide (or polynucleotide sequence) does not result in a longer polypeptide or polynucleotide sequence that can be found in nature as an intact protein (or its coding sequence) or a segment thereof.

When used in the context of describing a conjugate comprising the MYC-inhibiting peptide of SEQ ID NO:1 or a derivative thereof, the term "heterologous moiety" refers to a conjugation partner of the MYC-inhibiting peptide as one originated from a source other than ORF50 protein of the Kaposi's sarcoma-associated herpesvirus (KSHV). In embodiments where the conjugate of the MYC-inhibiting peptide and the heterologous moiety is a fusion protein, i.e., the heterologous moiety being another polypeptide and fused to the MYC-inhibiting peptide via a peptide bond, the fusion of two peptide partners should not result in the full length KSHV ORF50 protein and preferably not result in a segment of the KSHV ORF50 protein significantly longer than SEQ ID NO:1, e.g., a segment of more than 13, 14, 15, 16, or 17 amino acids in length. In some embodiments, the heterologous moiety may be one with therapeutic efficacy, e.g., the capability to cause death of target cells either by direct killing or by triggering programmed cell death (apoptosis). Such a therapeutic moiety may be a polypeptide in nature (e.g., an antibody, such as an anti-CD3 antibody, especially a single chain antibody ScFv) or a non-polypeptide (e.g., a cytotoxic agent in the form of a carbohydrate or oligonucleotide). In other embodiments, the heterologous moiety may be non-therapeutic in nature but serves as an affinity moiety, a targeting moiety, a detectable/signal moiety, or a solid support or provides other utilities so as to facilitate the detection, isolation, purification, tissue/cell-targeted delivery, and/or immobilization of the conjugate comprising the peptide of SEQ ID NO:1 or a derivative thereof.

The term "inflammation" refers to an organism's (e.g., a mammal's) immune response to irritation, toxic substances, pathogens, or other stimuli. The response can involve innate immune components and/or adaptive immunity. Inflammation is generally characterized as either chronic or acute. Acute inflammation can be characterized by, as non-limiting examples, redness, pain, heat, swelling, and/or loss of function due to infiltration of plasma proteins and leukocytes to the affected area. Chronic inflammation can be characterized by, as non-limiting examples, persistent inflammation, tissue destruction, and/or attempts at repair. Monocytes, macrophages, plasma B cells, and other lymphocytes are commonly recruited to the affected area, and angiogenesis and fibrosis can occur, in some instances leading to scar tissue.

The term "inflammatory condition" or "inflammatory disorder" refers to a condition or disorder that is characterized by or involving an inflammatory response, as described above. A list of exemplary inflammatory conditions includes: systemic lupus erythematosus (SLE), diabetes, chronic renal disease, asthma, autoimmune disease, chronic inflammation, chronic prostatitis, glomerulonephritis, hypersensitivities and allergies, skin disorders such as eczema, inflammatory bowel disease, pelvic inflammatory disease, reperfusion injury, rheumatoid arthritis, transplant rejection (e.g., graft versus host disease), cytokine storm syndrome, secondary hemophagocytic lymphohistiocytosis, sepsis, macrophage activation syndrome, and vasculitis.

An "autoimmune disease" is a disease in which a patient's immune system recognizes own tissues as foreign and mounts an abnormal immune response to attack the tissue. With the common symptoms of continuous and low grade of inflammation of affected tissue, a large number of autoimmune diseases have been recognized and include (but are not limited to): achalasia, Addison's disease, adult Still's disease, agammaglobulinemia, alopecia areata, amyloidosis, ankylosing spondylitis, anti-GBM/anti-TBM nephritis, antiphospholipid syndrome, autoimmune angioedema, autoimmune dysautonomia, autoimmune encephalomyelitis, autoimmune hepatitis, autoimmune inner ear disease (MED), autoimmune myocarditis, autoimmune oophoritis, autoimmune orchitis, autoimmune pancreatitis, autoimmune retinopathy, autoimmune urticaria, axonal & neuronal neuropathy (AMAN), Bali) disease, Behcet's disease, benign mucosal pemphigoid, bullous pemphigoid, Castleman disease (CD), Celiac disease, Chagas disease, chronic inflammatory demyelinating polyneuropathy (CIDP), chronic recurrent multifocal osteomyelitis (CRMO), Churg-Strauss Syndrome (CSS) or Eosinophilic Granulomatosis (EGPA), cicatricial pemphigoid, Cogan's syndrome, cold agglutinin disease, congenital heart block, coxsackie myocarditis, CREST syndrome, Crohn's disease, dermatitis herpetiformis, dermatomyositis, Devic's disease neuromyelitis optica), Discoid lupus, Dressler's syndrome, endometriosis, eosinophilic esophagitis (EoE), eosinophilic fasciitis, erythema nodosum, essential mixed cryoglobulinetnia, Evans syndrome, fibromyalgia, fibrosing alveolitis, giant cell arteritis (temporal arteritis), giant cell myocarditis, glomerulonephritis, Goodpasture's syndrome, granulomatosis with polyangiitis, Graves' disease, Guillain-Barre syndrome, Hashimoto's thyroiditis, hemolytic anemia, Henoch-Schonlein purpura (HSP), herpes gestationis or pemphigoid gestationis (PG), Hidradenitis Suppurativa (HS) (Acne Inversa), hypogammalglobulinemia, IgA Nephropathy, IgG4-related sclerosing disease, immune thrombocytopenic purpura (ITP), inclusion body myositis (IBM), interstitial cystitis (IC), juvenile arthritis, juvenile diabetes (Type 1 diabetes), juvenile myositis (JM), Kawasaki disease, Lambert-Eaton syndrome, leukocytoclastic vasculitis, lichen planus, lichen sclerosus, ligneous conjunctivitis, linear IgA disease (LAD), lupus, Lyme disease chronic, Meniere's disease, microscopic polyangiitis (MPA), mixed connective tissue disease (MCTD), Mooren's ulcer, Mucha-Habermann disease, Multifocal Motor Neuropathy (MMN) or MMNCB, multiple sclerosis, myasthenia gravis, myositis, narcolepsy, neonatal Lupus, neuromyelitis optica, neutropenia, ocular cicatricial pemphigoid, optic neuritis, palindromic rheumatism (PR), PANDAS, paraneoplastic cerebellar degeneration (PCD), paroxysmal nocturnal hemoglobinuria (PNH), Parry Romberg syndrome, pars planitis (peripheral uveitis), Parsonage-Turner syndrome, pemphigus, peripheral neuropathy, perivenous encephalomyelitis, pernicious anemia (PA), POEMS syndrome, polyarteritis nodosa, polyglandular syndromes type I, II, III, polymyalgia rheumatica, polymyositis, postmyocardial infarction syndrome, postpericardiotomy syndrome, primary biliary cirrhosis, primary sclerosing cholangitis, progesterone dermatitis, psoriasis, psoriatic arthritis, pure red cell aplasia (PRCA), pyoderma gangrenosum, Raynaud's phenomenon, Reactive Arthritis, reflex sympathetic dystrophy, relapsing polychondritis, Restless legs syndrome (RLS), retroperitoneal fibrosis, rheumatic fever, rheumatoid arthritis, sarcoidosis, Schmidt syndrome, scleritis, scleroderma, Sjögren's syndrome, Sperm & testicular autoimmunity, sperm & testicular autoimmunity, Stiff person syndrome (SPS), subacute bacterial endocarditis (SBE), Susac's syndrome, sympathetic ophthalmia (SO), Takayasu's arteritis, temporal arteritis/giant cell arteritis, thrombocytopenic purpura (TIP), thyroid eye disease (TED), Tolosa-Hunt syndrome (THS), transverse myelitis, type 1 diabetes, ulcerative colitis (VC), undifferentiated connective tissue disease (UCTD), uveitis, vasculitis, vitiligo, and Vogt-Koyanagi-Harada Disease.

The term "cancer" refers to any of various malignant neoplasms characterized by the proliferation of anaplastic cells that tend to invade surrounding tissue and metastasize to new body sites. Non-limiting examples of different types of cancer suitable for treatment using the compositions and methods of the present invention include colorectal cancer, colon cancer, anal cancer, liver cancer, ovarian cancer, breast cancer, lung cancer, bladder cancer, thyroid cancer, pleural cancer, pancreatic cancer, cervical cancer, prostate cancer, testicular cancer, bile duct cancer, gastrointestinal carcinoid tumors, esophageal cancer, gall bladder cancer, rectal cancer, appendix cancer, small intestine cancer, stomach (gastric) cancer, renal cancer (e.g., renal cell carcinoma), cancer of the central nervous system, skin cancer, oral squamous cell carcinoma, choriocarcinomas, head and neck cancers, bone cancer, osteogenic sarcomas, fibrosarcoma, neuroblastoma, glioma, melanoma, leukemia (e.g., acute lymphocytic leukemia, chronic lymphocytic leukemia, acute myelogenous leukemia, chronic myelogenous leukemia, or hairy cell leukemia), lymphoma (e.g., non-Hodgkin's lymphoma, Hodgkin's lymphoma, B-cell lymphoma, or Burkitt's lymphoma), and multiple myeloma.

The term "lymphoproliferative disorders" refers to any disorders characterized by abnormal proliferation of lymphocytes into a monoclonal lymphocytosis. Non-limiting examples of different types of lymphoproliferative disorders suitable for treatment using the compositions and methods of the present invention besides leukemia as described above include Waldenstrom's macroglobulinemia, Wiskott-Aldrich syndrome, Langerhans cell histiocytosis, Lymphocyte-variant hypereosinophila, Pityriasis Lichenoides, Post-transplant lymphoproliferative disorder, Autoimmune lymphoproliferative syndrome, Lymphoid interstitial pneumonia, Epstein-Barr virus-associated lymphoproliferative diseases. Castleman disease, and X-linked lymphoproliferative disease.

The term "suppressor cells" refers to any lymphocytes that can suppress productive immune response such as antibody production or T cell proliferation through various mechanisms including cell-cell contact, cytokines and killing. Non-limiting examples of different types of suppressive immune cells suitable for treatment using the compositions and methods of the present invention include T regulatory cells, Tr1 cells, B regulatory cells, and myeloid-derived suppressor cells.

3. Peptides that Inhibit MYC Activity in Cells

Sequence

The present disclosure provides peptides derived from the Kaposi's sarcoma-associated herpesvirus (KSHV), in particular from a conserved 13-amino acid region of ORF50, a viral KSHV protein, that is important for its interaction with NCoA2, a cellular coactivator of MYC and blocks the recruitment of coactivator complexes consisting of Nuclear receptor coactivator 2 (NCOA2), p300, and SWI/SNF proteins to the MYC promoter. The 13-amino acid peptide from ORF50 is referred to herein as MBK50 or VGN50 peptide. By introducing into cells the MBK50 peptide or a peptide based on/derived from MBK50 as described herein, MYC gene expression can be inhibited, e.g., in cancer cells in which MYC is overexpressed, thereby inhibiting MYC-induced gene transcription and cell growth, and in some cases killing the cells.

In particular embodiments, the peptide is at least 13 amino acids long and comprises (or consists of) the amino acid sequence of SEQ ID NO:1, or comprises a sequence identical to SEQ ID NO:1 at all but 1, 2, 3, or 4 positions. In some embodiments, the amino acid sequence of the peptide is about 70%, 80%, 85%, 90%, 92% or more identical to SEQ ID NO:1. In particular embodiments, the peptide is identical to SEQ ID NO:1 at all amino acid positions except for position 3 and/or position 13. The peptide can comprise any other amino acid at position 3 and/or position 13. In some embodiments, embodiments, the amino acid at position 3 of the peptide is a threonine. In some embodiments, the amino acid at position 13 of the peptide is a serine or glutamic acid. In some embodiments, the peptide is shorter than 13 amino acids, e.g., 11, or 12 amino acids, and in some embodiments, the peptide is longer than 13 amino acids, e.g., 14, 15, 16, 17, 18, 19, 20 or more amino acids. In some embodiments, e.g., when the MBK50 peptide is present within a fusion protein with another moiety such as an antibody or a cell-penetrating protein, the overall polypeptide comprising the peptide can be any length, e.g., about 15, 20, 21, 22, 23, 24, 25, 30, 35, 40, 45, 50, 55, 60, 65, 70, 75, 80, 85, 90, 95, 100, 150, 200, 250, 300, 350, 400, 450, 500 or more amino acids, or a length of about 10-20 amino acids, 20-30, 30-40, 40-50, 50-60, 60-70, 70-80, 80-90, 90-100, 100-150, 150-200, 200-300, 300-400, 400-500, or more amino acids.

Non-Standard Amino Acids

In some embodiments, the peptide comprises one or more non-standard amino acids, such as D-amino acids, β-alanine, or ornithine. In some embodiments, one or more of the amino acids within the peptide is a D-amino acid. D-amino acids can be present at any position in the peptide, e.g., at position 1, 2, 3, 4, 5, 6, 7, 8, 9, 10, 11, 12, 13, or any combination of any of these positions. In particular embodiments, one or more D-amino acids are present at the C-terminal amino acid or acids of the peptide, e.g., at position 13, or at positions 12 and 13, or at positions 11, 12, and 13. In a particular embodiment, the two C-terminal amino acids of the peptide are D-amino acids. In particular embodiments, the two C-terminal amino acids are Aspartic acid and Threonine, Serine, or Glutamic acid (i.e., -DT, -DS, -DE). D-amino acids can also be incorporated into larger peptides or polypeptides, such as fusion proteins, comprising the 13-amino acid MBK50 peptide. For example, in some embodiments, peptides are used comprising a modified TAT peptide linked to an MBK50 peptide, in which both the N-terminal amino acid of the overall peptide (e.g., an arginine within the TAT peptide) and the two C-terminal amino acids (e.g., aspartic acid+threonine/serine/glutamic acid within the MBK50 peptide) are D-amino acids. See, e.g., FIG. 2.

In some embodiments, the peptide comprises other, non-standard amino acids, such as ornithine, b-alanine, and others. Such amino acids can be incorporated at any position within the 13-amino acid MBK50 peptide or in a larger peptide or polypeptide or fusion protein comprising the MBK50 peptide as well as one or more additional moieties such as an antibody or cell penetrating protein.

D-amino acids and other non-standard amino acids can be incorporated into the peptide using any suitable method. For example, they can be incorporated during chemical synthesis of the peptide using known methods, or during the production of recombinant peptides in cell free systems using genetic code reprogramming (see, e.g., Katoh et al., *Cell Chem Biol* 24:46-64).

Conjugates

In some embodiments, the peptide of this invention is conjugated to a heterologous moiety, e.g., a moiety designed to allow easy isolation/identification of the peptide, to improve stability/bioavailability of the peptide, or to target the peptide to a specific cell type and/or facilitate entry into cells. The moiety can be attached to the peptide using a chemical linker, or, when the moiety is also a polypeptide, through a peptide bond, i.e., the two peptides or polypeptides are present in a single polypeptide chain as a fusion protein. In some cases, the linker is a cleavable peptide linker so as to allow easy separation of the peptide and its conjugation partner at the presence of an appropriate protease.

In some embodiments, the moiety is a cell penetrating peptide (CPP) (see, e.g., Patel et al. (2019) Scientific Reports 9: article no. 298; the entire disclosure of which is herein incorporated by reference). In particular embodiments, the CPP is a TAT peptide (GRKKRRQRRRPQ (SEQ ID NO: 2), derived from the transactivator of transcription (TAT) of HIV), or a variant or derivative thereof. In some embodiments, the CPP comprises one or more non-standard amino acids, e.g. a D-amino acid, β-alanine, and/or ornithine. In a particular embodiment, the TAT peptide comprises a D-amino acid, β-alanine, or ornithine, e.g., the sequence: d-Arg-KKRR-Ornithine-RRR-β-alanine as shown in FIG. 2. In particular embodiments, the TAT peptide (or other CPP) is present in a single polypeptide chain with the 13-amino acid MYC inhibiting peptide, e.g., N-terminal to the MYC-inhibiting peptide. In some embodiments, the TAT peptide is immediately N-terminal of the MYC-inhibiting peptide (see, e.g., FIG. 2). In other embodiments, a linker and/or other elements are present between the TAT and MYC-inhibiting peptides. In one embodiment, the peptide is administered as a conjugate with a modified TAT protein, e.g., as follows:
d-Arg-KKRR-Ornithine-RRR-β-alanine-LSSILQG-LYQLDT, or d-Arg-KKRR-Ornithine-RRR-B-alanine-LSSILQGLYQL-d-Asp-d Thr, or d-Arg-KKRR-Ornithine-RRR-B-alanine-LSSILQGLYQL-d-Asp-d Ser, or d-Arg-KKRR-Ornithine-RRR-B-alanine-LSSILQGLYQL-d-Asp-d Glu, or d-Arg-KKRR-Ornithine-RRR-B-alanine-LSTILQGLYQL-d-Asp-d Thr. See, e.g., FIG. 2.

In some embodiments, the conjugation partner of the MYC-inhibiting peptide is a therapeutic moiety, which may provide a therapeutic benefit similar to or different from that of the MYC-inhibiting peptide. The conjugation of the two partners not only can add a separate aspect of the conjugate in its therapeutic applications but also can enhance the efficacy of each partner alone. For instance, the presence of the therapeutic moiety can result in the increase of the anti-proliferation or anti-inflammation efficacy of the MYC-inhibiting peptide by at least 20%, 30%, 40%, 50%, 60%, 70%, 80%, 90%, 100% or more, such as by at least 1.5, 2, 2.5, 3, 5, 10, 20, 25, 50, 80, 100, or 500, or 1000-fold. Further, the presence of the two partners in a close physical proximity can generate a synergistic effect of the two partners' combined therapeutic efficacy. For example, the resulting anti-cancer effect of the conjugate may represent an increase from the additive effect of the two partners by at least 50%, 100%, 150%, 200% or more, such as 3, 4, 5, 6, 7, 8, 9, 10-fold or more.

In some embodiments, the heterologous moiety serves to deliver the conjugate to a predetermined target organ, tissue, or cell type, e.g., cancer cells, immune cells such as T or B cells, which would permit targeted treatment of malignancies such as breast cancer, lung cancer, and various types of lymphoproliferative disorders including leukemia and lymphoma (e.g., B-cell lymphoma) as well as inflammatory conditions including autoimmune disease such as systemic lupus erythematosus by targeting autoreactive B cells or diabetes and multiple sclerosis by targeting autoreactive T cells. For graft versus host disease in transplantation rejection, T cells attacking host tissues can be mitigated. Another example includes targeting IgE-producing B cells in the skin or systemically in allergic diseases such as atopic dermatitis. In some embodiments, in addition to directly targeting the tumors, suppressor cells such as $Foxp^{3+}$ T regulatory cells or myeloid derived suppressor cells in tumors can be concomitantly targeted to increase the overall anti-tumor efficacy.

Antibody Conjugates

In some embodiments, the peptide of this invention is conjugated to an antibody or fragment thereof, e.g., an antibody that binds specifically or preferentially to a cancer cell in which MYC is overexpressed (i.e., a "MYC-associated cancer", or a "MYC-dependent cancer") or to a lymphoid cell such as B or T cell involved in an inflammatory disorder. In such embodiments, the antibody or antibody fragment can direct the peptide in vivo to MYC-dependent cancer cells where the peptide can be internalized by the cell and inhibit MYC activity. In such embodiments, the antibody can be linked to the peptide by including both a single chain antibody and a peptide in a single polypeptide chain. In some embodiments, the peptide and the antibody are separated by a linker, e.g., a linker with a protease (for example, matrix metalloprotease) cleavage site so as to liberate the peptide in the vicinity of the target cell. In other embodiments, an antibody or antibody fragment can be chemically linked to the peptide.

In addition to antibodies and antibody fragments, any molecule that binds specifically to a MYC-dependent cancer cell or to a target lymphoid cell (such as B or T cell) can be linked to the peptides of the invention. For example, ligands to receptors on the surface of MYC-dependent cancer cells can be used. Any molecule on the surface of MYC-dependent cancer cells or lymphoid cells can be targeted, as can any kind of MYC-associated cancer (see, e.g., Dang (2012) Cell 149(1):22-35; Gabay et al. (2014) Cold Spr. Harb. Persp. Med. 4(6):a014241. In some embodiments, the cancer is a primary effusion lymphoma (PEL) or multiple myeloma. In somer embodiments, the antigen recognized by the antibody is CD3, which allows the use of the MYC-inhibiting peptide conjugate for treating cancers such as T-cell lymphomas. In some embodiments, the antigen recognized by the antibody is EGFR, which allows the use of the MYC-inhibiting peptide conjugate for treating cancers such as breast cancer. In many cases, such antibody itself has anti-cancer efficacies, expecting synergistic effects. Combination of peptide conjugated and non-conjugated form to target same cell would fyrther beneif activation of immune effects by ADCC and cancer cell growth inhibition by MYC inhibitin. Thus, the peptide may enhance the efficacy of therapeutic antibodies such as those targeting EGFR or VEGF, e.g., FDA-approved anti-cancer antibody drugs, including Bevacizumb, Ramucirumab that target VEGF, Cetuximab and Trastuzumab targeting EGFR receptor as well as Herceptin for HER2. Often such antibodies are humanized in order to minimize any undesirable immune response. In some cases, the peptide of this invention is linked with a desired antibody and used by employing a clevable linker together with a protease such as matrix metalloprotease.

An exemplary immunoglobulin (antibody) structural unit comprises a tetramer. Each tetramer is composed of two identical pairs of polypeptide chains, each pair having one "light" chain (about 25 kDa) and one "heavy" chain (about 50-70 kDa). The N-terminus of each chain defines a variable region of about 100 to 110 or more amino acids primarily responsible for antigen recognition. Thus, the terms "variable heavy chain," "$V_H$", or "VH" refer to the variable region of an immunoglobulin heavy chain, including an Fv, scFv, dsFv or Fab; while the terms "variable light chain," "$V_L$", or "VL" refer to the variable region of an immunoglobulin light chain, including of an Fv, scFv, dsFv or Fab. Equivalent molecules include antigen binding proteins having the desired antigen specificity, derived, for example, by modifying an antibody fragment or by selection from a phage display library.

In some embodiments, the antibody is a monoclonal antibody. In some embodiments, the antibody is a polyclonal antibody. In some embodiments, the antibody is a chimeric antibody. In some embodiments, the antibody is a humanized antibody. In some embodiments, the antibody is a human antibody. In some embodiments, the antibody is an antigen-binding fragment, such as a F(ab')2, Fab', Fab, scFv, and the like. The term "antibody or antigen-binding fragment" can also encompass multi-specific and hybrid antibodies, with dual or multiple antigen or epitope specificities. In particular embodiments, the antibody is a single chain antibody.

In some embodiments, the antibody comprises a heavy chain sequence or a portion thereof, and/or a light chain sequence or a portion thereof, of an antibody sequence disclosed herein. In some embodiments, the antibody comprises one or more complementarity determining regions (CDRs) of an antibody as disclosed herein. In some embodiments, the antibody is a nanobody, or single-domain antibody (sdAb), comprising a single monomeric variable antibody domain, e.g., a single VHH domain.

Other Elements

In addition to the MBK50 peptide and an optional moiety such as a CPP or antibody or antibody fragment, the peptides used in the present invention can comprise other elements such as linkers separating the different elements within a peptide, signal sequences, and nuclear localization sequences.

In some embodiments, two or more elements within a peptide of the invention are separated by a flexible linker. Suitable linkers for separating protein domains are known in the art, and can comprise, e.g., glycine and serine residues, e.g., from 2-20 glycine and/or serine residues. In some embodiments, the linker can comprise protease cleavage sites, e.g., serine protease cleavage sites, such that, e.g., the peptide can be separated from an antibody after being directed to a MYC-dependent cell. In some embodiments, the peptide can comprise a nuclear localization signal, enabling the peptide to enter the nucleus where it can bind to NCoA2 and inhibit MYC activity. In some embodiments, the peptide comprises a cysteine residue at the C-terminus, to allow further chemical conjugation. In particular embodiments, the peptide (or polypeptide) comprises a 13-amino acid MBK50 peptide of the invention, a humanized antibody targeting a specific cell or tissue type of interest, and a linker separating the antibody from the MYC-inhibiting peptide, wherein the linker comprises a protease cleavage site, and optionally a nuclear localization signal (NLS).

Preparing Antibodies

For preparing an antibody that binds to a MYC-associated cancer cell or a target lymphoid cell such as B or T cell, many techniques known in the art can be used. See, e.g., Kohler & Milstein, Nature 256:495-497 (1975); Kozbor et al., Immunology Today 4: 72 (1983); Cole et al., pp. 77-96 in Monoclonal Antibodies and Cancer Therapy, Alan R. Liss, Inc. (1985); Coligan, Current Protocols in Immunology (1991); Harlow & Lane, Antibodies, A Laboratory Manual (1988); and Goding, Monoclonal Antibodies: Principles and Practice (2nd ed. 1986)). In some embodiments, antibodies are prepared by immunizing an animal or animals (such as mice, rabbits, or rats) with an antigen for the induction of an antibody response. In some embodiments, the antigen is administered in conjugation with an adjuvant (e.g., Freund's adjuvant). In some embodiments, after the initial immunization, one or more subsequent booster injections of the antigen can be administered to improve antibody production. Following immunization, antigen-specific B cells are harvested, e.g., from the spleen and/or lymphoid tissue. For generating monoclonal antibodies, the B cells are fused with myeloma cells, which are subsequently screened for antigen specificity.

The genes encoding the heavy and light chains of an antibody of interest can be cloned from a cell, e.g., the genes encoding a monoclonal antibody can be cloned from a hybridoma and used to produce a recombinant monoclonal antibody. Gene libraries encoding heavy and light chains of monoclonal antibodies can also be made from hybridoma or plasma cells. Additionally, phage or yeast display technology can be used to identify antibodies and heteromeric Fab fragments that specifically bind to selected antigens (see, e.g., McCafferty et al., *Nature* 348:552-554 (1990); Marks et al., *Biotechnology* 10:779-783 (1992); Lou et al., PEDS 23:311 (2010); and Chao et al., *Nature Protocols,* 1: 755-768 (2006)). Alternatively, antibodies and antibody sequences may be isolated and/or identified using a yeast-based antibody presentation system, such as that disclosed in, e.g., Xu et al., *Protein Eng Des Sel,* 2013, 26:663-670; WO 2009/036379; WO 2010/105256; and WO 2012/009568. Random combinations of the heavy and light chain gene products generate a large pool of antibodies with different antigenic specificity (see, e.g., Kuby, Immunology (3rd ed. 1997)). Techniques for the production of single chain antibodies or recombinant antibodies (U.S. Pat. Nos. 4,946,778, 4,816,567) can also be adapted to produce antibodies.

Antibodies can be produced using any number of expression systems, including prokaryotic and eukaryotic expression systems. In some embodiments, the expression system is a mammalian cell, such as a hybridoma, or a CHO cell. Many such systems are widely available from commercial suppliers. In embodiments in which an antibody comprises both a VH and VL region, the VH and VL regions may be expressed using a single vector, e.g., in a di-cistronic expression unit, or be under the control of different promoters. In other embodiments, the VH and VL region may be expressed using separate vectors.

In some embodiments, an antibody comprises one or more CDR, heavy chain, and/or light chain sequences that are affinity matured. For chimeric antibodies, methods of making chimeric antibodies are known in the art. For example, chimeric antibodies can be made in which the antigen binding region (heavy chain variable region and light chain variable region) from one species, such as a mouse, is fused to the effector region (constant domain) of another species, such as a human. As another example, "class switched" chimeric antibodies can be made in which the effector region of an antibody is substituted with an effector region of a different immunoglobulin class or subclass.

In some embodiments, the antibody comprises one or more CDR, heavy chain, and/or light chain sequences that are humanized. For humanized antibodies, methods of making humanized antibodies are known in the art. See, e.g., U.S. Pat. No. 8,095,890. Generally, a humanized antibody has one or more amino acid residues introduced into it from a source which is non-human. As an alternative to humanization, human antibodies can be generated. As a non-limiting example, transgenic animals (e.g., mice) can be produced that are capable, upon immunization, of producing a full repertoire of human antibodies in the absence of endogenous immunoglobulin production. For example, it has been described that the homozygous deletion of the antibody heavy-chain joining region (JH) gene in chimeric and germ-line mutant mice results in complete inhibition of endogenous antibody production. Transfer of the human germ-line immunoglobulin gene array in such germ-line mutant mice will result in the production of human antibodies upon antigen challenge. See, e.g., Jakobovits et al., *Proc. Natl. Acad. Sci. USA,* 90:2551 (1993); Jakobovits et al., *Nature,* 362:255-258 (1993); Bruggermann et al., *Year in Immun.,* 7:33 (1993); and U.S. Pat. Nos. 5,591,669, 5,589,369, and 5,545,807.

In some embodiments, antibody fragments (such as a Fab, a Fab', a F(ab')2, a scFv, nanobody, or a diabody) are generated. Various techniques have been developed for the production of antibody fragments, such as proteolytic digestion of intact antibodies (see, e.g., Morimoto et al., *J. Biochem. Biophys. Meth.,* 24:107-117 (1992); and Brennan et al., Science, 229:81 (1985)) and the use of recombinant host cells to produce the fragments. For example, antibody fragments can be isolated from antibody phage libraries. Alternatively, Fab'-SH fragments can be directly recovered from *E. coli* cells and chemically coupled to form F(ab')2 fragments (see, e.g., Carter et al., *BioTechnology,* 10:163-167 (1992)). According to another approach, F(ab')2 fragments can be isolated directly from recombinant host cell culture. Other techniques for the production of antibody fragments will be apparent to those skilled in the art.

Methods for measuring binding affinity and binding kinetics are known in the art. These methods include, but are not limited to, solid-phase binding assays (e.g., ELISA assay), immunoprecipitation, surface plasmon resonance (e.g., Biacore™ (GE Healthcare, Piscataway, NJ)), kinetic exclusion assays (e.g., KinExA®), flow cytometry, fluorescence-activated cell sorting (FACS), BioLayer interferometry (e.g., Octet™ (ForteBio, Inc., Menlo Park, CA)), and western blot analysis.

4. Preparing Recombinant Peptides

The peptides of the invention, i.e., isolated MBK50 peptides and/or fusion proteins or polypeptides comprising MBK50 peptides as well as other moieties such as antibodies or CPPs, can be prepared in any number of ways, including through chemical peptide synthesis or through recombinant methods.

Chemical Synthesis

In some embodiments, peptides may be synthesized by solid-phase peptide synthesis methods using procedures similar to those described by Merrifield et al., *J. Am. Chem. Soc.,* 85:2149-2156 (1963); Barany and Merrifield, *Solid-Phase Peptide Synthesis, in The Peptides: Analysis, Synthesis, Biology* Gross and Meienhofer (eds.), Academic Press, N.Y., vol. 2, pp. 3-284 (1980); and Stewart et al., *Solid Phase Peptide Synthesis* 2nd ed., Pierce Chem. Co., Rockford, Ill. (1984). During synthesis, N-α-protected amino acids having protected side chains are added stepwise to a growing polypeptide chain linked by its C-terminal and to a solid support, i.e., polystyrene beads. The peptides are synthesized by linking an amino group of an N-α-deprotected amino acid to an α-carboxy group of an N-α-protected amino acid that has been activated by reacting it with a reagent such as dicyclohexylcarbodiimide. The attachment of a free amino group to the activated carboxyl leads to peptide bond formation. The most commonly used N-α-protecting groups include Boc, which is acid labile, and Fmoc, which is base labile.

Peptides may also be synthesized by solid-phase peptide synthesis methods using procedures similar to those described by Merrifield et al., *J. Am. Chem. Soc.,* 85:2149-2156 (1963); Barany and Merrifield, *Solid-Phase Peptide Synthesis, in The Peptides: Analysis, Synthesis, Biology* Gross and Meienhofer (eds.), Academic Press, N.Y., vol. 2, pp. 3-284 (1980); and Stewart et al., *Solid Phase Peptide Synthesis* 2nd ed., Pierce Chem. Co., Rockford, Ill. (1984). During synthesis, N-α-protected amino acids having protected side chains are added stepwise to a growing polypeptide chain linked by its C-terminal and to a solid support, i.e., polystyrene beads. The peptides are synthesized by linking an amino group of an N-α-deprotected amino acid to an α-carboxy group of an N-α-protected amino acid that has been activated by reacting it with a reagent such as dicyclohexylcarbodiimide. The attachment of a free amino group to the activated carboxyl leads to peptide bond formation. The most commonly used N-α-protecting groups include Boc, which is acid labile, and Fmoc, which is base labile.

Recombinant Production

In some embodiments, the peptides or fusion proteins are produced recombinantly using standard molecular biology methods. For example, the nucleotide sequences coding the MBK50 peptide, and optionally an additional sequence such as a single chain antibody or a TAT peptide, can be synthesized using standard methods and cloned into a suitable expression vector, e.g., the His-tag expression vector pET30 (a)+. Recombinant TnC and FABP can then be expressed in suitable cells, e.g., *E. coli*, and purified, and the protein concentrations and purities determined by, e.g., BCA assay and SDS-PAGE, respectively.

Basic texts disclosing general methods and techniques in the field of recombinant genetics include Sambrook and Russell, *Molecular Cloning, A Laboratory Manual* (3rd ed. 2001); Kriegler, *Gene Transfer and Expression: A Laboratory Manual* (1990); and Ausubel et al., eds., *Current Protocols in Molecular Biology* (1994).

For nucleic acids, sizes are given in either kilobases (kb) or base pairs (bp). These are estimates derived from agarose or acrylamide gel electrophoresis, from sequenced nucleic acids, or from published DNA sequences. For proteins, sizes are given in kilodaltons (kDa) or amino acid residue numbers. Proteins sizes are estimated from gel electrophoresis, from sequenced proteins, from derived amino acid sequences, or from published protein sequences.

Oligonucleotides that are not commercially available can be chemically synthesized, e.g., according to the solid phase phosphoramidite triester method first described by Beaucage & Caruthers, *Tetrahedron Lett.* 22: 1859-1862 (1981), using an automated synthesizer, as described in Van Devanter et. al., *Nucleic Acids Res.* 12: 6159-6168 (1984). Purification of oligonucleotides is performed using any art-recognized strategy, e.g., native acrylamide gel electrophoresis or anion-exchange HPLC as described in Pearson & Reanier, *J. Chrom.* 255: 137-149 (1983).

The sequence of a polynucleotide encoding a peptide of this invention can be verified after cloning or subcloning using, e.g., the chain termination method for sequencing double-stranded templates of Wallace et al., *Gene* 16: 21-26 (1981).

Polynucleotide sequences encoding the peptides of this invention can be determined based on their amino acid sequences. They can be isolated, e.g., from a KSHV genomic library or can be synthesized by a commercial supplier. Nucleic acid sequences encoding the peptides of this invention can be isolated using standard cloning techniques such as polymerase chain reaction (PCR). Most commonly used techniques for this purpose are described in standard texts, e.g., Sambrook and Russell, supra.

Based on sequence homology, degenerate oligonucleotides can be designed as primer sets and PCR can be performed under suitable conditions (see, e.g., White et al., *PCR Protocols: Current Methods and Applications,* 1993; Griffin and Griffin, *PCR Technology,* CRC Press Inc. 1994) to amplify a segment of nucleotide sequence from a cDNA or genomic library. Using the amplified segment as a probe, a longer length nucleic acid encoding a peptide of this invention is obtained.

Upon acquiring a nucleic acid sequence encoding a peptide of this invention, the coding sequence can be modified as appropriate (e.g., adding a coding sequence for a heterologous tag, such as an affinity tag, for example, 6×His tag or GST tag) and then be subcloned into a vector, for instance, an expression vector, so that a recombinant peptide can be produced from the resulting construct, for example, after transfection and culturing host cells under conditions permitting recombinant protein expression directed by a promoter operably linked to the coding sequence.

In some embodiments, the polynucleotide sequence encoding a peptide of the invention can be further altered to coincide with the preferred codon usage of a particular host. For example, the preferred codon usage of one strain of bacterial cells can be used to derive a polynucleotide that encodes a peptide of this invention and includes the codons favored by this strain. The frequency of preferred codon usage exhibited by a host cell can be calculated by averaging frequency of preferred codon usage in a large number of genes expressed by the host cell (e.g., calculation service is available from web site of the Kazusa DNA Research Institute, Japan). This analysis is preferably limited to genes that are highly expressed by the host cell.

To obtain high level expression of a nucleic acid encoding a peptide of the present invention, a polynucleotide encoding the polypeptide can be subcloned into an expression vector that contains a strong promoter (typically heterologous) to direct transcription, a transcription/translation terminator and a ribosome binding site for translational initiation. Suitable bacterial promoters are well known in the art and described, e.g., in Sambrook and Russell, supra, and Ausubel et al., supra. Bacterial expression systems for expressing a recombinant polypeptide are available in, e.g., *E. coli, Bacillus sp., Salmonella,* and *Caulobacter.* Kits for such expression systems are commercially available. Eukaryotic expression systems for mammalian cells, yeast, and insect cells are well known in the art and are also commercially available. In one embodiment, the eukaryotic expression vector is an adenoviral vector, an adeno-associated vector, or a retroviral vector.

The promoter used to direct expression of a heterologous nucleic acid depends on the particular application. The promoter is optionally positioned about the same distance from the heterologous transcription start site as it is from the transcription start site in its natural setting. As is known in the art, however, some variation in this distance can be accommodated without loss of promoter function. In one embodiment, the promoter is an IPTG-inducible promoter.

In addition to the promoter, the expression vector typically includes a transcription unit or expression cassette that contains all the additional elements required for the expression of the peptide in host cells. A typical expression cassette thus contains a promoter operably linked to the coding sequence and signals required for efficient polyadenylation of the transcript, ribosome binding sites, and translation termination. The nucleic acid sequence encoding the peptide is typically linked to a cleavable signal peptide sequence to promote secretion of the recombinant polypeptide by the transformed cell. Such signal peptides include, among others, the signal peptides from tissue plasminogen activator, insulin, and neuron growth factor, and juvenile hormone esterase of Heliothis virescens. Additional elements of the cassette may include enhancers and, if genomic DNA is used as the structural gene, introns with functional splice donor and acceptor sites.

In addition to a promoter sequence, the expression cassette should also contain a transcription termination region downstream of the structural gene to provide for efficient termination. The termination region may be obtained from the same gene as the promoter sequence or may be obtained from different genes.

The particular expression vector used to transport the genetic information into the cell is not particularly critical. Any of the conventional vectors used for expression in eukaryotic or prokaryotic cells may be used. Standard bacterial expression vectors include plasmids such as pBR322 based plasmids, pSKF, pET23D, pET30(a)+, and fusion expression systems such as GST and LacZ. Epitope tags can also be added to recombinant proteins to provide convenient methods of isolation, e.g., c-myc.

Expression vectors containing regulatory elements from eukaryotic viruses are typically used in eukaryotic expression vectors, e.g., SV40 vectors, papilloma virus vectors, and vectors derived from Epstein-Barr virus. Other exemplary eukaryotic vectors include pMSG, pAV009/A$^+$, pMTO10/A$^+$, pMAMneo-5, baculovirus pDSVE, and any other vector allowing expression of proteins under the direction of the SV40 early promoter, SV40 later promoter, metallothionein promoter, murine mammary tumor virus promoter, Rous sarcoma virus promoter, polyhedrin promoter, or other promoters shown effective for expression in eukaryotic cells.

Some expression systems have markers that provide gene amplification such as thymidine kinase, hygromycin B phosphotransferase, and dihydrofolate reductase. Alternatively, high yield expression systems not involving gene amplification are also suitable, such as a baculovirus vector in insect cells, with a polynucleotide sequence encoding the peptide under the direction of the polyhedrin promoter or other strong baculovirus promoters.

The elements that are typically included in expression vectors also include a replicon that functions in *E. coli*, a gene encoding a protein that provides antibiotic resistance to permit selection of bacteria that harbor recombinant plasmids, and unique restriction sites in nonessential regions of the plasmid to allow insertion of eukaryotic sequences. The particular antibiotic resistance gene chosen is not critical, any of the many resistance genes known in the art are suitable. The prokaryotic sequences are optionally chosen such that they do not interfere with the replication of the DNA in eukaryotic cells, if necessary. Similar to antibiotic resistance selection markers, metabolic selection markers based on known metabolic pathways may also be used as a means for selecting transformed host cells.

When periplasmic expression of a recombinant protein (e.g., a MBK50 peptide or fusion protein of the present invention) is desired, the expression vector further comprises a sequence encoding a secretion signal, such as the *E. coli* OppA (Periplasmic Oligopeptide Binding Protein) secretion signal or a modified version thereof, which is directly connected to 5' of the coding sequence of the protein to be expressed. This signal sequence directs the recombinant protein produced in cytoplasm through the cell membrane into the periplasmic space. The expression vector may further comprise a coding sequence for signal peptidase 1, which is capable of enzymatically cleaving the signal sequence when the recombinant protein is entering the periplasmic space. More detailed description for periplasmic production of a recombinant protein can be found in, e.g., Gray et al., *Gene* 39: 247-254 (1985), U.S. Pat. Nos. 6,160,089 and 6,436,674.

Transfection

Standard transfection methods are used to produce bacterial, mammalian, yeast, insect, or plant cell lines that express large quantities of a recombinant polypeptide, which are then purified using standard techniques (see, e.g., Colley et al., *J. Biol. Chem.* 264: 17619-17622 (1989); *Guide to Protein Purification*, in *Methods in Enzymology*, vol. 182 (Deutscher, ed., 1990)). Transformation of eukaryotic and prokaryotic cells are performed according to standard techniques (see, e.g., Morrison, *J. Bact.* 132: 349-351 (1977); Clark-Curtiss & Curtiss, *Methods in Enzymology* 101: 347-362 (Wu et al., eds, 1983).

Any of the well-known procedures for introducing foreign nucleotide sequences into host cells may be used. These include the use of calcium phosphate transfection, polybrene, protoplast fusion, electroporation, liposomes, microinjection, plasma vectors, viral vectors and any of the other well-known methods for introducing cloned genomic DNA, cDNA, synthetic DNA, or other foreign genetic material into a host cell (see, e.g., Sambrook and Russell, supra). It is only necessary that the particular genetic engineering procedure used be capable of successfully introducing at least one gene into the host cell capable of expressing the recombinant polypeptide.

Detection of Expression in Host Cells

After the expression vector is introduced into appropriate host cells, the transfected cells are cultured under conditions favoring expression of the peptide. The cells are then screened for the expression of the recombinant polypeptide, which is subsequently recovered from the culture using standard techniques (see, e.g., Scopes, *Protein Purification: Principles and Practice* (1982); U.S. Pat. No. 4,673,641; Ausubel et al., supra; and Sambrook and Russell, supra).

Several general methods for screening gene expression are well known among those skilled in the art. First, gene expression can be detected at the nucleic acid level. A variety of methods of specific DNA and RNA measurement using nucleic acid hybridization techniques are commonly used (e.g., Sambrook and Russell, supra). Some methods involve an electrophoretic separation (e.g., Southern blot for detecting DNA and Northern blot for detecting RNA), but detection of DNA or RNA can be carried out without electrophoresis as well (such as by dot blot). The presence of nucleic acid encoding a peptide in transfected cells can also be detected by PCR or RT-PCR using sequence-specific primers.

Second, gene expression can be detected at the polypeptide level. Various immunological assays are routinely used by those skilled in the art to measure the level of a gene product, particularly using polyclonal or monoclonal antibodies that react specifically with a peptide of this invention (e.g., Harlow and Lane, *Antibodies, A Laboratory Manual*, Chapter 14, Cold Spring Harbor, 1988; Kohler and Milstein, *Nature*, 256: 495-497 (1975)). Such techniques require antibody preparation by selecting antibodies with high specificity against the peptide. The methods of raising polyclonal and monoclonal antibodies are well established and their descriptions can be found in the literature, see, e.g., Harlow and Lane, supra; Kohler and Milstein, *Eur. J. Immunol.*, 6: 511-519 (1976).

Purification of Recombinantly Produced Peptides

Once the expression of a recombinant peptide of this invention in transfected host cells is confirmed, the host cells are then cultured in an appropriate scale for the purpose of purifying the recombinant polypeptide.

When the peptides of the present invention are produced recombinantly by transformed bacteria in large amounts, typically after promoter induction, although expression can be constitutive, the polypeptides may form insoluble aggregates. There are several protocols that are suitable for purification of protein inclusion bodies. For example, purification of aggregate proteins (hereinafter referred to as inclusion bodies) typically involves the extraction, separation and/or purification of inclusion bodies by disruption of bacterial cells, e.g., by incubation in a buffer of about 100-150 μg/ml lysozyme and 0.1% Nonidet P40, a non-ionic detergent. The cell suspension can be ground using a Polytron grinder (Brinkman Instruments, Westbury, NY). Alternatively, the cells can be sonicated on ice. Alternate methods of lysing bacteria are described in Ausubel et al. and Sambrook and Russell, both supra, and will be apparent to those of skill in the art.

The cell suspension is generally centrifuged and the pellet containing the inclusion bodies resuspended in buffer which does not dissolve but washes the inclusion bodies, e.g., 20 mM Tris-HCl (pH 7.2), 1 mM EDTA, 150 mM NaCl and 2% Triton-X 100, a non-ionic detergent. It may be necessary to repeat the wash step to remove as much cellular debris as possible. The remaining pellet of inclusion bodies may be resuspended in an appropriate buffer (e.g., 20 mM sodium phosphate, pH 6.8, 150 mM NaCl). Other appropriate buffers will be apparent to those of skill in the art.

Following the washing step, the inclusion bodies are solubilized by the addition of a solvent that is both a strong hydrogen acceptor and a strong hydrogen donor (or a combination of solvents each having one of these properties). The proteins that formed the inclusion bodies may then be renatured by dilution or dialysis with a compatible buffer. Suitable solvents include, but are not limited to, urea (from about 4 M to about 8 M), formamide (at least about 80%, volume/volume basis), and guanidine hydrochloride (from about 4 M to about 8 M). Some solvents that are capable of solubilizing aggregate-forming proteins, such as SDS (sodium dodecyl sulfate) and 70% formic acid, may be inappropriate for use in this procedure due to the possibility of irreversible denaturation of the proteins, accompanied by a lack of immunogenicity and/or activity. Although guanidine hydrochloride and similar agents are denaturants, this denaturation is not irreversible and renaturation may occur upon removal (by dialysis, for example) or dilution of the denaturant, allowing re-formation of the immunologically and/or biologically active protein of interest. After solubilization, the protein can be separated from other bacterial proteins by standard separation techniques. For further description of purifying recombinant polypeptides from bacterial inclusion body, see, e.g., Patra et al., *Protein Expression and Purification* 18: 182-190 (2000).

Alternatively, it is possible to purify recombinant polypeptides from bacterial periplasm. Where the recombinant protein is exported into the periplasm of the bacteria, the periplasmic fraction of the bacteria can be isolated by cold osmotic shock in addition to other methods known to those of skill in the art (see e.g., Ausubel et al., supra). To isolate recombinant proteins from the periplasm, the bacterial cells are centrifuged to form a pellet. The pellet is resuspended in a buffer containing 20% sucrose. To lyse the cells, the bacteria are centrifuged and the pellet is resuspended in ice-cold 5 mM $MgSO_4$ and kept in an ice bath for approximately 10 minutes. The cell suspension is centrifuged and the supernatant decanted and saved. The recombinant proteins present in the supernatant can be separated from the host proteins by standard separation techniques well known to those of skill in the art.

Protein Separation Techniques for Purification

When a recombinant polypeptide is expressed in host cells in a soluble form, its purification can follow a standard protein purification procedure as described herein. Such standard purification procedures are also suitable for purifying a polypeptide obtained from chemical synthesis.

Solubility Fractionation

Often as an initial step, and if the protein mixture is complex, an initial salt fractionation can separate many of the unwanted host cell proteins (or proteins derived from the cell culture media) from the recombinant protein of interest. The preferred salt is ammonium sulfate. Ammonium sulfate precipitates proteins by effectively reducing the amount of water in the protein mixture. Proteins then precipitate on the basis of their solubility. The more hydrophobic a protein is, the more likely it is to precipitate at lower ammonium sulfate concentrations. A typical protocol is to add saturated ammonium sulfate to a protein solution so that the resultant ammonium sulfate concentration is between 20-30%. This will precipitate the most hydrophobic proteins. The precipitate is discarded (unless the protein of interest is hydrophobic) and ammonium sulfate is added to the supernatant to a concentration known to precipitate the protein of interest. The precipitate is then solubilized in buffer and the excess salt removed if necessary, through either dialysis or diafiltration. Other methods that rely on solubility of proteins, such as cold ethanol precipitation, are well known to those of skill in the art and can be used to fractionate complex protein mixtures.

Size Differential Filtration

Based on a calculated molecular weight, a protein of greater and lesser size can be isolated using ultrafiltration through membranes of different pore sizes (for example, Amicon or Millipore membranes). As a first step, the protein mixture is ultrafiltered through a membrane with a pore size that has a lower molecular weight cut-off than the molecular weight of a protein of interest, e.g., MYC-inhibiting peptide. The retentate of the ultrafiltration is then ultrafiltered against a membrane with a molecular cut off greater than the molecular weight of the protein of interest. The recombinant protein will pass through the membrane into the filtrate. The filtrate can then be chromatographed as described below.

Column Chromatography

The proteins of interest (such as a peptide of the present invention) can also be separated from other proteins on the basis of their size, net surface charge, hydrophobicity, or affinity for ligands. In addition, antibodies raised against the peptide can be conjugated to column matrices and the corresponding peptide immunopurified. All of these methods are well known in the art. It will be apparent to one of skill that chromatographic techniques can be performed at any scale and using equipment from many different manufacturers (e.g., Pharmacia Biotech).

5. Assessing Inhibition of MYC Activity

Any of a number of methods can be used to assess the level of MYC activity in a cell, e.g., a MYC-dependent cancer cell. Any MYC expressing cells can be used. In particular embodiments, primary effusion lymphoma (PEL) cells are used, such as BC-1, BC-3, BCBL-1, or BJAB cells.

In some embodiments, the methods involve the detection of MYC (e.g., mRNA) expression, which can be analyzed using routine techniques such as RT-PCR, Real-Time RT-PCR, semi-quantitative RT-PCR, quantitative polymerase chain reaction (qPCR), quantitative RT-PCR (qRT-PCR), multiplexed branched DNA (bDNA) assay, microarray hybridization, or sequence analysis (e.g., RNA sequencing ("RNA-Seq")). Methods of quantifying polynucleotide expression are described, e.g., in Fassbinder-Orth, *Integrative and Comparative Biology*, 2014, 54:396-406; Thellin et al., *Biotechnology Advances*, 2009, 27:323-333; and Zheng et al., *Clinical Chemistry*, 2006, 52:7 (doi: 10/1373/clinchem.2005.065078). In some embodiments, real-time or quantitative PCR or RT-PCR is used to measure the level of a polynucleotide (e.g., mRNA) in a biological sample. See, e.g., Nolan et al., *Nat. Protoc*, 2006, 1:1559-1582; Wong et al., *BioTechniques*, 2005, 39:75-75. Quantitative PCR and RT-PCR assays for measuring gene expression are also commercially available (e.g., TaqMan® Gene Expression Assays, ThermoFisher Scientific).

In some embodiments, the methods involve the detection of MYC protein levels, e.g., using routine techniques such as immunoassays, two-dimensional gel electrophoresis, and quantitative mass spectrometry that are known to those skilled in the art. Protein quantification techniques are generally described in "Strategies for Protein Quantitation," *Principles of Proteomics*, 2nd Edition, R. Twyman, ed., Garland Science, 2013. In some embodiments, protein expression or stability is detected by immunoassay, such as but not limited to enzyme immunoassays (EIA) such as enzyme multiplied immunoassay technique (EMIT), enzyme-linked immunosorbent assay (ELISA), IgM antibody capture ELISA (MAC ELISA), and microparticle enzyme immunoassay (META); capillary electrophoresis immunoassays (CEIA); radioimmunoassays (RIA); immunoradiometric assays (IRMA); immunofluorescence (IF); fluorescence polarization immunoassays (FPIA); and chemiluminescence assays (CL). If desired, such immunoassays can be automated. Immunoassays can also be used in conjunction with laser induced fluorescence (see, e.g., Schmalzing et al., *Electrophoresis*, 18:2184-93 (1997); Bao, *J. Chromatogr. B. Biomed. Sci.*, 699:463-80 (1997)).

In some embodiments, the peptides are assessed by determining their ability to inhibit MYC-dependent cancer cell growth in vitro. For example, the growth and/or survival of PEL cells such as BC3 cells in culture can be measured, e.g., using an MTS assay. In some embodiments, the growth of cells such as human malignant lymphoma cells such as NU-DUL-1 can be assessed, e.g., their growth in soft agar.

The peptides can also be assessed in vivo using animal models, e.g., in tumor growth assays in xenograft models such as PEL cell xenograft models.

The peptides, including isolated MBK50 peptides as well as larger peptides or polypeptides comprising MBK50 peptides as well as antibodies or other elements, can also be assessed for their pharmacokinetic and/or pharmacodynamic properties. In some embodiments, the stability of the peptides and/or fusion proteins is assessed, e.g., assessed in vivo. In some embodiments, the localization of the peptides and/or fusion proteins is assessed, e.g., the localization in vivo, including in the vicinity of cells targeted by an antibody within a fusion protein. In a particular embodiment, the peptides are evaluated using PK/PD modeling (see, e.g., Danhof et al., (2008) Trends in Pharm. Sci. 29(4):186-191; Standing (2017) Br. J. Clin. Pharmacol. 83:247-254).

In some embodiments, the polynucleotide sequence encoding the MBK50 peptide of SEQ ID NO:1 or derived from SEQ ID NO:1 or a fusion peptide thereof is delivered to the intended recipient by using a viral vector. Suitable viral vectors can be derived from the genome of a human or animal adenovirus, vaccinia virus, herpes virus, adeno-associated virus (AAV), minute virus of mice (MVM), HIV, sindbis virus, and retroviruses (including but not limited to Rous sarcoma virus and lentivirus), Maloney Murine Leukemia Virus (MoMLV), and the like. Typically, the coding sequence of interest (e.g., one encoding for SEQ ID NO:1 or its derivative or a fusion protein thereof as described herein) are inserted into such vectors to allow packaging of the gene construct, typically with accompanying viral DNA, followed by infection of a sensitive host cell and expression of the coding sequence of interest. In other embodiments, cells comprising the MBK50 peptide of SEQ ID NO:1 or derived from SEQ ID NO:1 or a fusion peptide thereof, the polynucleotide sequence encoding the peptide or fusion peptide, or a vector such as an expression cassette comprising the polynucleotide coding sequence are delivered to the intended recipient in a pharmaceutical composition described herein.

6. Dosage and Administration

Subjects

The subject can be any subject, e.g., a human or another mammal, with a condition linked to excess MYC activity. In particular embodiments, the subject has a MYC-dependent cancer, such as primary effusion lymphoma (PEL) or multiple myeloma. In some embodiments, the subject has an inflammatory disorder involving inappropriately activated lymphoid cells such as B or T cells. In some embodiments, the subject is a human. In some embodiments, the subject is an adult. In some embodiments, the subject is a child (e.g., a child with progeria). In some embodiments, the subject is female (e.g., an adult female). In some embodiments, the subject is male (e.g., an adult male).

Pharmaceutical Compositions

The present disclosure provides compositions comprising isolated and/or purified MBK50 peptides capable of binding to NCoA2 as well as SWI/SNF complex component peptides and thus inhibiting MYC activity in cells, and a pharmaceutically acceptable carrier. As such, the present disclosure provides pharmaceutical compositions for inhibiting MYC activity in cells of a subject, for killing MYC-dependent cancer cells or inappropriately activated lymphoid cells such as B or T cells in a subject, and for treating MYC-dependent cancer or an inflammatory disorder such as an autoimmue disease in a subject.

The pharmaceutical compositions of the present invention may comprise a pharmaceutically acceptable carrier. In certain aspects, pharmaceutically acceptable carriers are determined in part by the particular composition being administered, as well as by the particular method used to administer the composition. Accordingly, there is a wide variety of suitable formulations of pharmaceutical compositions of the present invention (see, e.g., REMINGTON'S PHARMACEUTICAL SCIENCES, 18TH ED., Mack Publishing Co., Easton, PA (1990)).

The pharmaceutical compositions will often further comprise one or more buffers (e.g., neutral buffered saline or phosphate buffered saline), carbohydrates (e.g., glucose, mannose, sucrose or dextrans), mannitol, proteins, polypeptides or amino acids such as glycine, antioxidants (e.g., ascorbic acid, sodium metabisulfite, butylated hydroxytoluene, butylated hydroxyanisole, etc.), bacteriostats, chelating agents such as EDTA or glutathione, solutes that render the formulation isotonic, hypotonic or weakly hypertonic with the blood of a recipient, suspending agents, thickening agents, preservatives, flavoring agents, sweetening agents, and coloring compounds as appropriate.

The pharmaceutical compositions of the invention are administered in a manner compatible with the dosage formulation, and in such amount as will be therapeutically or prophylactically effective. The quantity to be administered depends on a variety of factors including, e.g., the age, body weight, physical activity, hereditary characteristics, general health, sex, and diet of the individual, the condition or disease to be treated or prevented, and the stage or severity of the condition or disease. In certain embodiments, the size of the dose may also be determined by the existence, nature, and extent of any adverse side effects that accompany the administration of a therapeutic or prophylactic agent(s) in a particular individual. Other factors that can influence the specific dose level and frequency of dosage for any particular patient include the activity of the specific compound employed, the metabolic stability and length of action of that compound, the mode and time of administration, and the rate of excretion.

Generally, for administering the compound (e.g., a conjugate comprising a MBK50 peptide or a variant thereof and a heterologous moiety or a nucleic acid encoding a fusion protein comprising a MBK50 peptide or a variant thereof and a heterologous polypeptide or in a liposome form) for therapeutic or prophylactic purposes, the compound is given at a therapeutically or prophylactically effective dose. In particular, an effective amount of a pharmaceutical composition of the invention is an amount that is sufficient to inhibit MYC activity in one or more cells of the subject, or to slow, prevent, or reverse the growth of MYC-dependent cancer cells in the subject.

In certain embodiments, the dose may take the form of solid, semi-solid, lyophilized powder, or liquid dosage forms, such as, for example, tablets, pills, pellets, capsules, powders, solutions, suspensions, emulsions, suppositories, retention enemas, creams, ointments, lotions, gels, aerosols, foams, or the like, preferably in unit dosage forms suitable for simple administration of precise dosages.

As used herein, the term "unit dosage form" refers to physically discrete units suitable as unitary dosages for humans and other mammals (e.g., an ampoule), each unit containing a predetermined quantity of a therapeutic or prophylactic agent calculated to produce the desired onset, tolerability, and/or therapeutic or prophylactic effects, in association with a suitable pharmaceutical excipient. In addition, more concentrated dosage forms may be prepared, from which the more dilute unit dosage forms may then be produced. The more concentrated dosage forms thus will contain substantially more than, e.g., at least 1, 2, 3, 4, 5, 6, 7, 8, 9, 10, or more times the amount of the therapeutic or prophylactic compound.

Methods for preparing such dosage forms are known to those skilled in the art (see, e.g., REMINGTON'S PHARMACEUTICAL SCIENCES, supra). The dosage forms typically include a conventional pharmaceutical carrier or excipient and may additionally include other medicinal agents, carriers, adjuvants, diluents, tissue permeation enhancers, solubilizers, and the like. Appropriate excipients can be tailored to the particular dosage form and route of administration by methods well known in the art (see, e.g., REMINGTON'S PHARMACEUTICAL SCIENCES, supra).

Administration

In some embodiments, prevention and/or treatment includes administering compositions of the present invention directly to a subject. As a non-limiting example, pharmaceutical compositions of the present invention (e.g., containing a MYC-inhibiting peptide conjugate of the invention, a nucleic acid encoding a fusion protein comprising a MYC-inhibiting peptide, or an engineered cell comprising such a nucleic acid including expression cassette encoding a fusion protein comprising a MYC-inhibiting peptide as described herein plus a pharmaceutically acceptable carrier) can be delivered directly to a subject (e.g., by local application or systemic administration).

Compositions of the present invention may be administered as a single dose or as multiple doses, for example two doses administered at an interval of about one month, about two months, about three months, about six months, or about 12 months. Other suitable dosage schedules can be determined by a medical practitioner.

In some embodiments, additional compounds or medications can be co-administered to the subject. Such compounds or medications can be co-administered for the purpose of alleviating signs or symptoms of the disease being treated, reducing side effects caused by treatment with the peptide, reducing cancer growth or killing cancer cells through a different mechanism, etc.

The pharmaceutical compositions of the invention can be administered locally or systemically to the subject, e.g., intraperitoneally, intramuscularly, intra-arterially, orally, intravenously, intracranially, intrathecally, intraspinally, intralesionally, intranasally, subcutaneously, intracerebroventricularly, topically, and/or by inhalation.

7. Kits

In another aspect, kits are provided herein. In some embodiments, the kit comprises an MBK50 peptide and/or fusion protein of the invention. In some embodiments, the kit is for reducing, slowing, stopping, or reversing the proliferation of MYC-dependent cancer cells or lymphoid cells such as B or T cells in a subject. In some embodiments, the kit is for preventing or treating a disease, e.g., a cancer such as PEL or an autoimmune disease.

Kits of the present invention can be packaged in a way that allows for safe or convenient storage or use (e.g., in a box or other container having a lid). Typically, kits of the present invention include one or more containers, each container storing a particular kit component such as a reagent, a control sample, and so on. The choice of container will depend on the particular form of its contents, e.g., a kit component that is in liquid form, powder form, etc. Furthermore, containers can be made of materials that are designed to maximize the shelf-life of the kit components. As a non-limiting example, kit components that are light-sensitive can be stored in containers that are opaque.

In some embodiments, the kit contains one or more elements, e.g. syringe, useful for administering compositions (i.e., a pharmaceutical composition of the invention) to a subject. In yet other embodiments, the kit further comprises instructions for use, e.g., containing directions (i.e., protocols) for the practice of the methods of this invention (e.g., instructions for using the kit for inhibiting MYC activity in cells or for treating a subject with a MYC-dependent cancer or an inflammatory condition such as an autoimmune disease). While the instructional materials typically comprise written or printed materials, they are not limited to such. Any medium capable of storing such instructions and communicating them to an end user is contemplated by this invention. Such media include, but are not limited to electronic storage media (e.g., magnetic discs, tapes, cartridges, chips), optical media (e.g., CD ROM), and the like. Such media may include addresses to internet sites that provide such instructional materials.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1. Transcription Active Complex Targeting Cancer Drug from Viral Protein Sequence We recently found that a viral protein encoded by Kaposi's sarcoma-associated herpesvirus (KSHV), hijacks MYC transcription function. We mapped the responsible domain and molecular mechanisms with biochemical and genetic approaches (FIG. 1). Mechanistically, the viral protein physically interacts with a cellular coactivator, NCoA2, whose function is critical for MYC expression as well as MYC transactivation. Our studies indicated that by taking over the co-activator complex from MYC, the virus robustly activates its own +80 gene transcription in infected cells. Subsequent studies identified that a 13-amino acid sequence stretch, which is conserved with other gamma-herpesviruses (FIG. 2), was important for the interaction with the coactivator. Remarkably, delivering the peptide but not a mutant (control) peptide into PEL, a MYC-dependent cancer, killed the cancer cells (FIG. 1J). Transcriptome studies clearly demonstrated that the peptide targets MYC pathways with the highest enrichment scores with zero false discovery rate. Thus, our peptide named MBK50 (MYC Buster KSHV ORF50) specifically and effectively targets MYC, representing a unique approach to finally drug the undruggable. Furthermore, our recent xenograft studies have demonstrated efficacies of the MBK50 to target PEL without any measurable toxicities to the host (NRG) mice.
Approaches:

Overview: Recent genomics studies identified that NCoA2 fusion with other cellular protein occurs frequently in different cancer types; this is consistent with our model that NCoA2 has the ability to establish gene enhancers at recruited genomic sites (FIG. 1). If the peptide is indeed targeting enhancer formation via inhibition of NCoA2 protein complex formation with other coactivator enzymes (FIG. 1C), this peptide drug should be even more effective against cancer cells with NCoA2 gene rearrangements, in addition to MYC-addicted cancer cells. Accordingly, as described elsewhere herein, we increase the stability of the peptide by modifying amino acid sequences. Secondly, taking advantage of its small size, we prepare and express the peptide as a fusion protein or chemically conjugate with FDA-approved antibody-based drugs. We hypothesize that conjugating our peptide to the existing antibody-based drugs should increase efficacy and specificity of cancer cell killing effects. An important difference between our peptide and toxin conjugation (as in ADCs) is that our peptide is targeting the MYC pathway, which is elevated in the majority of cancer cells but not in normal cells. Therefore, our peptide should not harm normal resting cells, because MYC activation is tightly regulated in normal cells; this is in agreement with lack of toxicity we have seen in our xenograft studies.
Design New Peptides by Substituting Amino Acids to Avoid Patent Issues, Increasing Stability, and Measuring PK/PD in Rats.

In order to avoid patenting restrictions of natural sequences, we modify an amino acid to (i) have non-natural sequence, and (ii) increase stability of the peptide. Within 13 amino acids of MBK50, 9 amino acids were completely conserved among 5 different types of gamma-herpesviruses. However, 4 amino acids are slightly different, even though they have similar biochemical properties (FIG. 2). Evolution in gamma-herpesvirus, which still retain the essential function of this gene, suggests that those amino acid positions are interchangeable. Accordingly, we substitute an amino acid in MBK50 peptide(s) to generate "non-natural peptide sequences" that should retain biological activity. We then test efficacies of MYC inhibition as in FIGS. 1H-J. In addition, two amino acids at the C-terminus are also modified to D-amino acids. Changing to D-amino acids is expected to further increase stability by preventing degradation in serum (4).

Based on cell killing efficacies of the peptide in vitro, we select two peptides and examine the efficacies to inhibit tumor growth in xenograft models. We use a PEL cell xenograft models. This is because (i) PEL is caused by KSHV infection and we are developing the drug peptide based on KSHV protein sequence, (ii) we have already established the xenograft model in our lab, and (iii) PEL is a very aggressive subtype of B-cell lymphoma and it is also a very rare cancer, which would expedite the FDA-review process as an orphan drug, with smaller numbers of clinical trials in the future. Current clinical approaches for PEL do not work well, and we urgently need new directions. Standardized PK/PD studies are completed in rat models at the UCD comprehensive cancer center PK/PD core facility.

Example 2: Targeting Blasting B-cells by MBK50 Peptide

Figure 3:
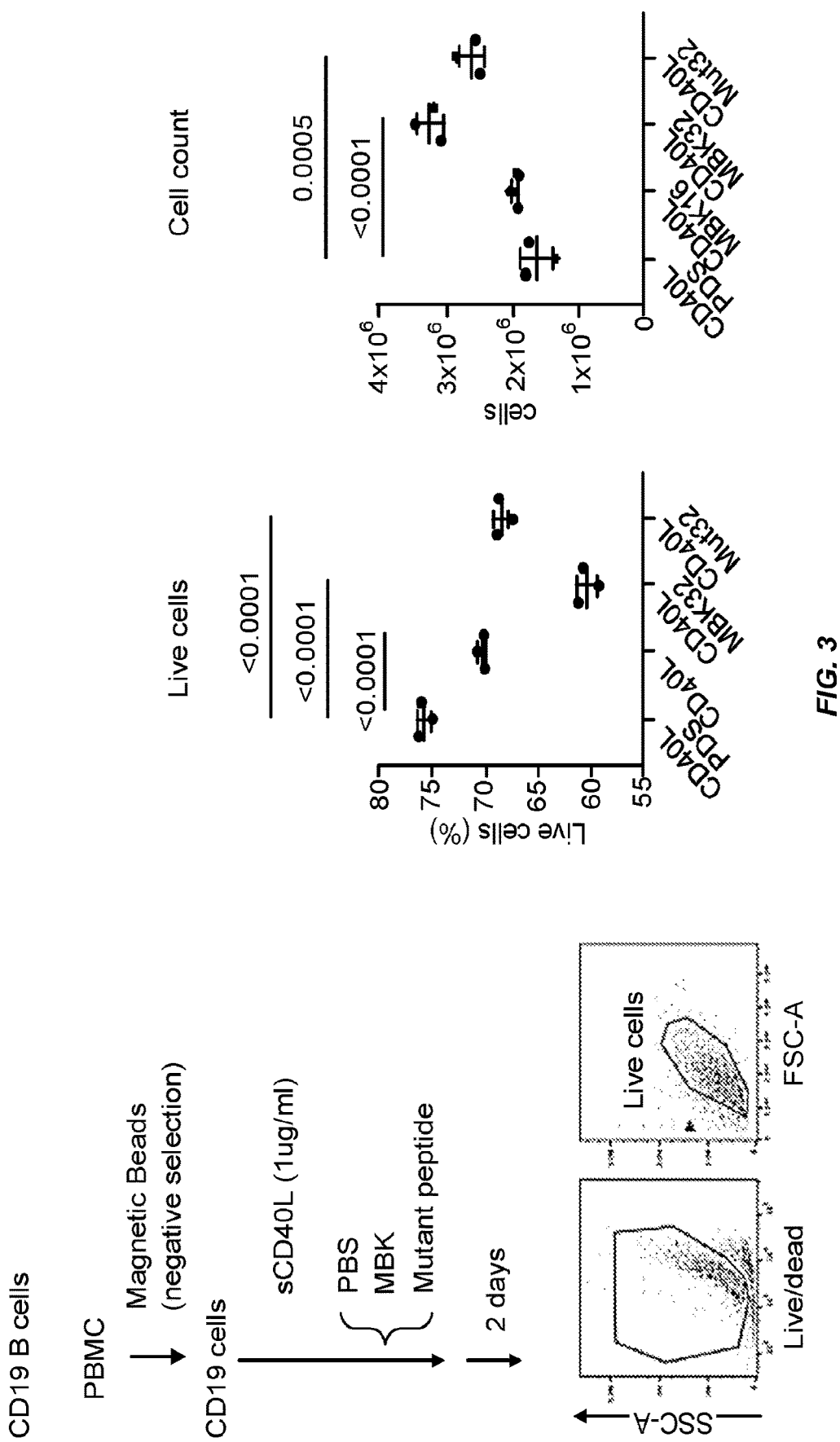
FIG. 3. Effect on CD19+ B cell response upon sCD40L stimulation.
Figure 4:
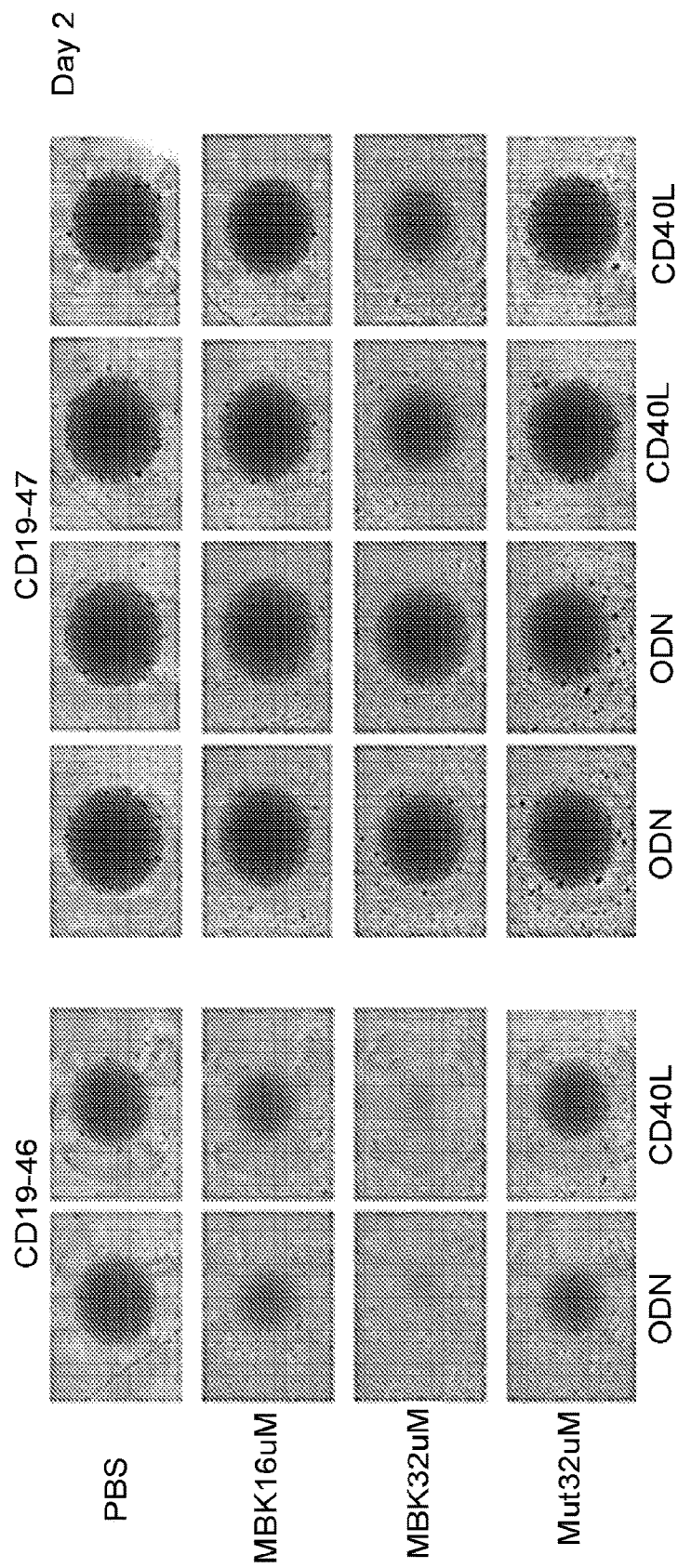
FIG. 4. Effect on CD19+ B cell expansion in response to stimuli.

CD19$^+$ B cells were isolated with magnetic beads from PBMC of a healthy donor (n=1). Cells were washed and cultured at $1\times10^6$/ml in a 96 well plate (200 µl/well in triplicates) without or with sCD40L (1 µg/ml) in the presence of MBK50 (16 or 32 µM) or mutant peptide (32 µM) for 2 days. Live cells were determined as shown in FIG. 3 left panel using live/dead-red staining (live cells are gated as red-staining negative population). The frequency of live cells (%) is shown in FIG. 3 middle panel. MBK50 32 µM increased total cell numbers but showed reduced live cell %, indicating the induction of activation cell death with the peptide in B cells. The peptide drug targets actively replicating B-cells that is consistent with MBK50 targeting MYC.

B cells were prepared by magnetic beads from healthy donor PBMC (n=2). Representative pictures of B cell culture in a 96 well U-bottom plate in the presence of sCD40L (T cell dependent stimulation) or ODN 2006 (TLR9 ligand)(T cell independent stimulation) at indicated concentration without or with MBK50 (16, 32 µM) or mutant peptide (32 µM). The radius of cell volume in each well roughly correlate to the total cell numbers. The cell volume upon was significantly reduced by MBK50 32 µM upon ODN or sCD40L stimulation for donor #46 and less so for donor #47.

These results indicate that this peptide can be used to block proliferation of activated B cells and therefore can be used to treat pathogenic B cell proliferation in autoimmune diseases such as lupus.

Example 3: Targeting Blasting T-Cells by MBK50 Peptide

To evaluate the effect of the peptide on human CD3 T cells, CD3 T cells were enriched by magnetic beads (CD3 positive selection beads, Stemcell technology) from PBMC samples from 5 healthy donors and stimulated with anti-CD3/28 tetramer (Stemcell technology) in triplicates for 16 hours before treating with PBS, MBK50 (32 µM) and Mutant peptide (32 µM) for 24 hours. Activated proliferating IRF4$^+$Ki67$^+$ CD3 T cells (red square in FIG. 5) in the culture were analyzed by live/dead-red staining (Invitrogen) and intracellular staining with anti-Ki67-FITC (Biolegend) and anti-IRF4-APC (Biolegend) antibodies. A representative flow cytometry profiles are shown in FIG. 5(a) for gating live CD3 T cell population and FIG. 5(b) Ki67 vs IRF4 for the gated live CD3 T cells. For FIG. 5(c-e), the means of triplicate cultures in each experiment for live cells % (c, n=5), total CD3 T cell numbers (d, n=5), and % of Ki67$^+$ cells (e, n=3) are shown in the top panel. The bottom panel are normalized data to PBS control cultures. P values calculated with Prism using one-way ANOVA with paired comparison. p<0.05 statistically significant.

These results indicate that MBK peptide again preferentially targets actively dividing cells. The peptide drug can be used to inhibit T cell proliferation during acute inflammation by attenuating robust lymphoid cell growth, indication for use of auto-immune disease or acute inflammatory diseases.

Example 4: MBK50 Peptide Targets Other Cell Types at Different Efficacies

Figure 6A:
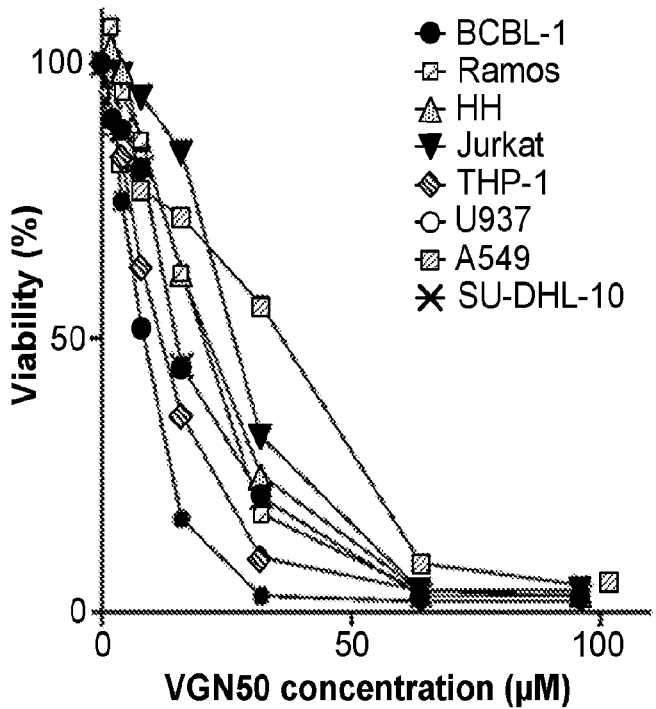
FIG. 6(A) The effect of VGN50 on various cancer cell types. MTT assays were performed with the indicated cell lines treated with various VGN50 concentrations. The O.D. of mock-treated samples were set as 100%, and O.D. from detergent treated cells were set as 0%. Percentage viability+/−SD was calculated for each treatment (N=3 samples/treatment).
Figure 6B:
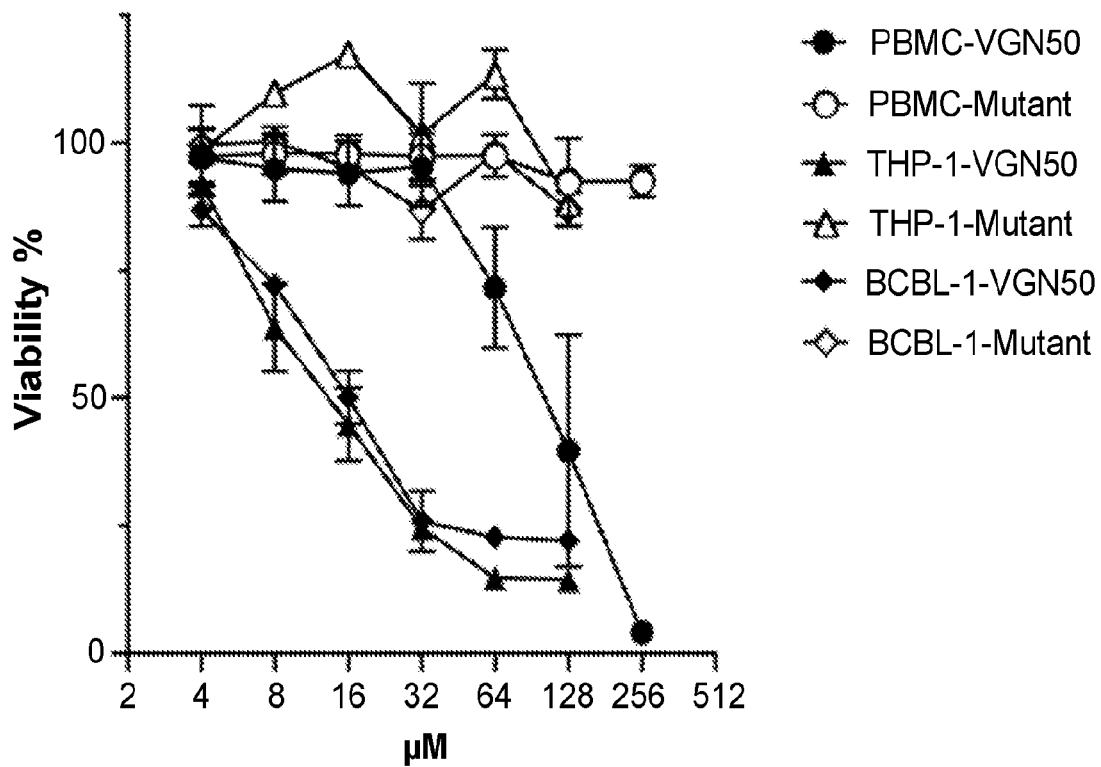
FIG. 6(B) Viability assay with flow cytometry. Cell viability was measured in triplicate with live/dead staining and the cell killing effects on cancer cells was compared with normal peripheral blood mononuclear cells (PBMC) from three healthy donors. Results are presented as percentage viability+/−SD deviation (N=3 samples/group).

As shown in FIG. 6(a), multiple cancer cell lines were used for MTT assay to evaluate cancer cell killing efficacies of the MBK50 peptide at different concentrations (cell variability studies). Different concentrations (0, 2, 4, 8, 16, 32, 64, 96 µM) of peptides were incubated with indicated cell lines: BCBL-1 (primary effusion lymphoma cell line), Ramos (Burkitt's lymphoma cell line), SU-DHL-10 (large B cell lymphoma), HH (T-cell non-Hodgkin lymphoma), Jurkat (acute T cell leukemia cell line), THP-1 (monocyte), U937 cell line (monocyte), and A549 (lung epithelial cell line) were used for comparison. The results indicate that the peptide drug is more effective to lymphoid cell lines. Importantly, human peripheral blood mononuclear cells (PBMCs) from healthy donors were approximately 10-fold less sensitive to MBK-mediated killing compared to myeloid and lymphoid cancer cell lines (e.g., THP-1 and BCBL-1) as assessed by flow cytometry after live/dead staining (FIG. 6(b)). Therefore, when a dose selected appropriately, MBK50 can selectively kill cancers without damaging normal cells and tissues.

Figure 7:
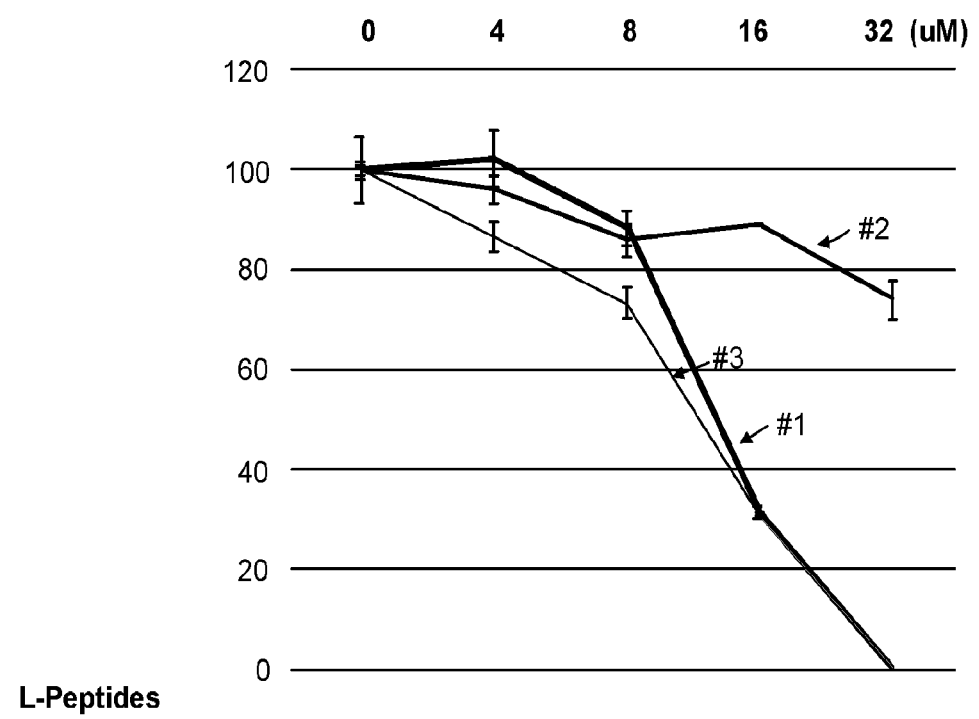
FIG. 7. Cell growth inhibition with deletion peptides identified key amino acid residue.

Example 5: Peptide Drugs Targets BCL2 Mutated Non-Hodgkin's B-Cell Lymphomas BCL2 mutations are frequently seen in B-cell lymphoma and the cell types are often refractory to chemotherapy due to anti-apoptotic phenotype. The results show that the peptide drug still works on BCL2 negative lymphoma cell lines, which adds value to the peptide drug. In addition, Essential Leucine residue is identified with the deletion peptides. Both Peptides 1 and 3 inhibited NU-DUL1 cell growth, but deletion of leucine (Peptide 2) diminished the function. See FIG. 7.

Example 6: Generation of Non-Natural Peptides and their Efficacy in Cell Killing In Vitro Amino acid sequence alignment identified homologous protein sequences in other gamma-herpesvirus protein sequence (The Top table in FIG. 8a, also shown in FIG. 2). Based on their alignment, "non-natural" protein sequences were generated by substituting specific amino acids (The peptides are: Wt d1-1, DS 3-1, DE 3-1, and Mut d1-1 (control peptide) from the top to the bottom in the Bottom Table in FIG. 8a). Those four peptides were used in MTT assays in FIG. 8b to examine the effects on cell growth of BCBL-1 peripheral effusion lymphoma (PEL) cell line. Also tested are three D-amino acid substitutions first two amino acids and c-terminal amino acid (ST d3-1), in comparison with one D-amino acid peptide (N-terminus) (Wt d3-1). FIG. 8b shows that five peptides (Wt d1-1, DS 3-1, DE 3-1, ST d3-1 and Wt d3-1) killed BCBL-1 cells in vitro at similar efficacies compared to Mut d1-1 control peptide. In vivo xenograft study of BCBL-1 PEL cell line also showed that the peptides Wt d1-1 and Wt d3-1 (meaning three D-amino acids with one D-amino acid wild type sequence) both had similar anti-tumor growth effects.

Example 7: Identification of MBK50 Targets with SLAM-seq

Thiol(SH)-linked alkylation for the metabolic sequencing of RNA (SLAM seq), an orthogonal-chemistry-based RNA sequencing technology detects 4-thiouridine (s4U) incorporation in RNA species at single-nucleotide resolution. Using SLAM-seq method, BC-1 cells were incubated with peptide drug and peptide with three amino acid substitute to alanine was used as a control peptide. Peptide drug was incubated in BC-1 cell culture (24 µM) and after 30 min drug incubation, 4sU (300 µM in final concentration) was added into culture media for 1 hour. Total RNA was isolated in the end of 1 hour 4sU incubation and alkylated RNA samples were subjected to SLAM-seq. Samples were duplicated and changed gene expression vs mock-treated cells (P<0.05) was marked in red. The Wt-peptide but not mutant peptide inhibited multiple cellular gene expression (FIG. 9 right panel, marked in red dots with P<0.05). IGV viewer was used to visualize sequence reads at MYC region (Chr. 8). The transcript species containing T→C mutation were significantly decreased in presence of MBK50 peptide, but not mutant peptide. Log 2 fold changes and adjusted P-value of MYC down regulation in both BCBL-1 and BC-1 cells are depicted in underneath of panel. Finally, Gene Set Enrichment Analyses of total RNA-sequence at 24 hours post-drug treatment showed enrichment of MYC-target gene down-regulation, which is consistent with significant-inhibition of MYC expression in presence of Wt-peptide (MBK50).

Figure 10:
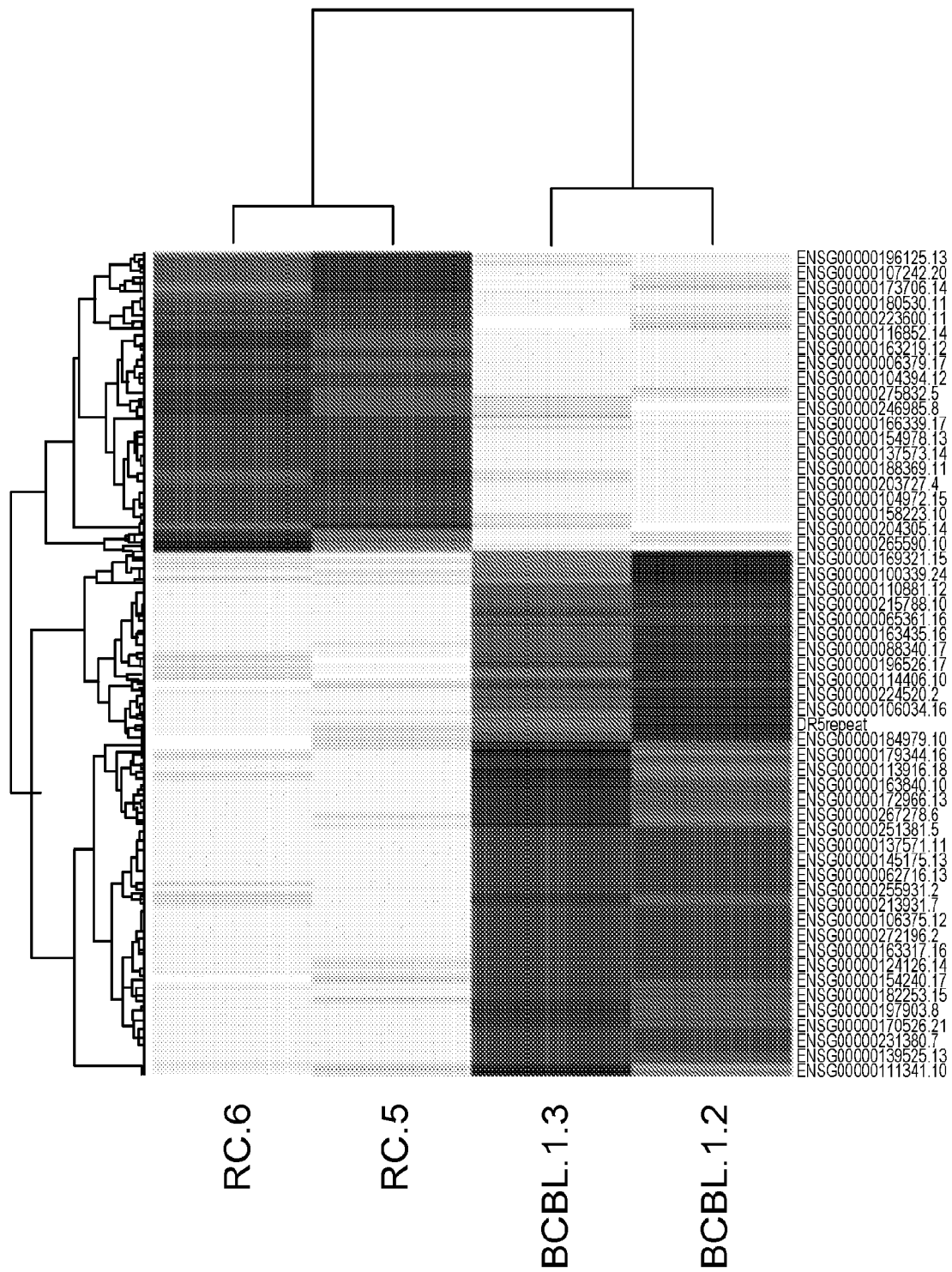
FIG. 10. Peptide long-term treatment changes B-cell phenotype. RNA-seq was performed after generating peptide-drug resistant cell population. RC cell showed distinguished gene expression pattern from parental cells and latently-infected gamma-herpesvirus gene expression was significantly abolished in the cells.

Example 8: Inhibition of Kaposi's Sarcoma-Associated Herpesvirus (KSHV) Replication The peptide sequence is based on KSHV transactivator protein sequence, and it is expected that the peptide will compete with viral transactivator protein for recruitment of cellular transactivation complex. We continued to incubate with peptide drug in KSHV-naturally infected B-cells and generated resistant cell line (RC). The resistant cells were then used to identify putative drug targets by comparing parental cells with total RNA-sequencing. As shown in FIG. 10, the Z-score data, which identify most significantly altered gene expression, demonstrate that latently infected KSHV gene expression were significantly down-regulated with continued peptide incubation. The results indicate that delivering this peptide drug to KSHV infected B-cells not only kills primary effusion lymphomas via Myc down-regulation but also suppresses latently-infected KSHV replication, demonstrating dual benefit to use KSHV-associated malignancies (e.g., Kaposi's sarcoma, multi centric Castleman disease, and primary effusion lymphomas).

Example 9: Inhibition of Inflammatory Cytokine Production In Vivo

Figure 11:
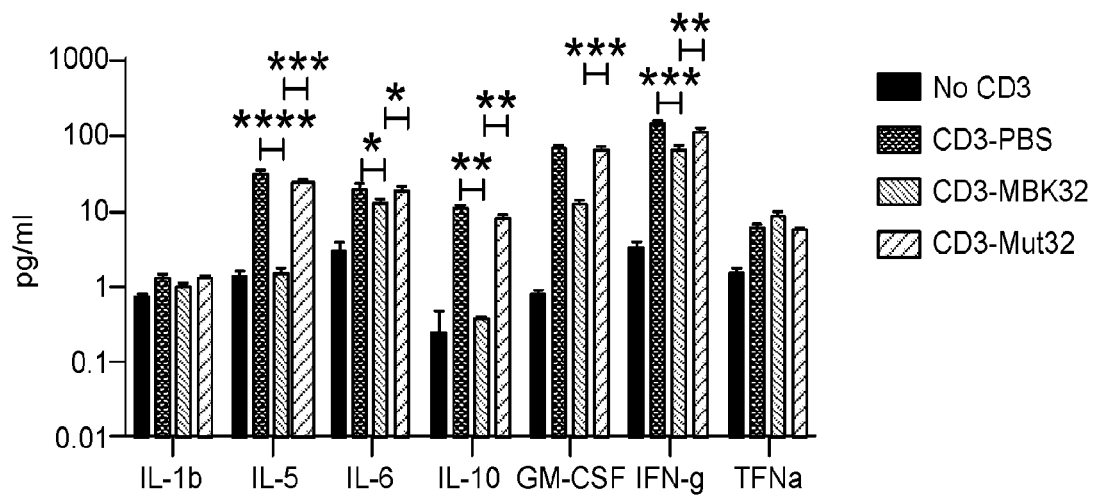
FIG. 11. Effect on inflammatory cytokine production by activated T cells.

The effect of the peptide on cytokine production by human lymphoctyes were studied by an in vitro culture system. PBMCs were stimulated with anti-CD3 antibody in the presence of PBS, MBK50 (32 µM) or Mutant peptide (32 µM) in duplicates for 48 hours. The supernatant was recovered and assayed for 10 common cytokines 4-1(3, IL-2, IL-4, IL-5, IL-6, IL-8, IL-10, GM-CSF, IFNγ, TNFα) with Luminex using human 10 plex beads assay kit (Invitrogen). With the assay condition, 7 cytokines (shown in FIG. 11) were detected. All cytokines were substantially increased in the cultures stimulated with anti-CD3 antibody (red, CD3-PBS) compared to non-stimulation (blue, No CD3), mainly produced by activated CD3 T cells. All the cytokine levels except IL-10 and TNFα were significantly reduced in the peptide-treated cultures (green, CD3-MBK32) compared to untreated control (red, CD3-PBS) and control peptide-treated cultures (purple, CD3-Mut32). These results indicate that the peptide MBK50 can be used to block cytokine production from T cells and therefore can be used to control pathogenic T cell response in inflammatory diseases or autoimmune diseases.

Figure 12A:
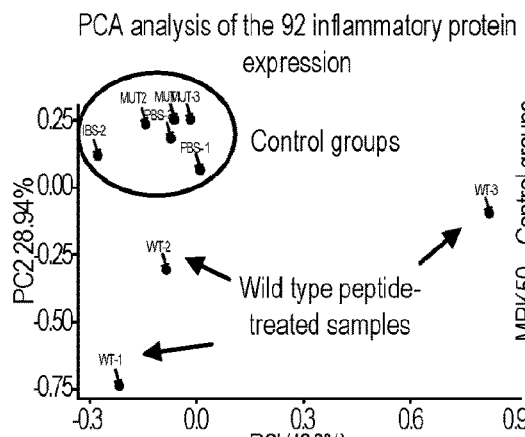
FIGS. 12(A)-(C). Effect on cytokine profiles of PEL cells.
Figure 12B:
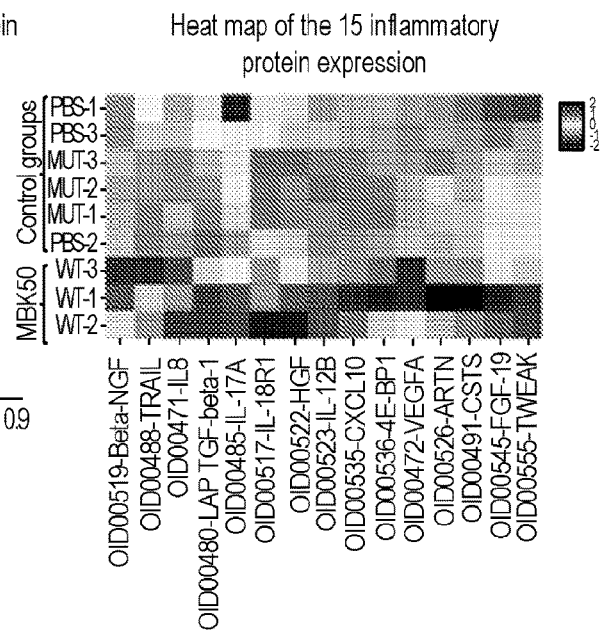
Figure 12C:
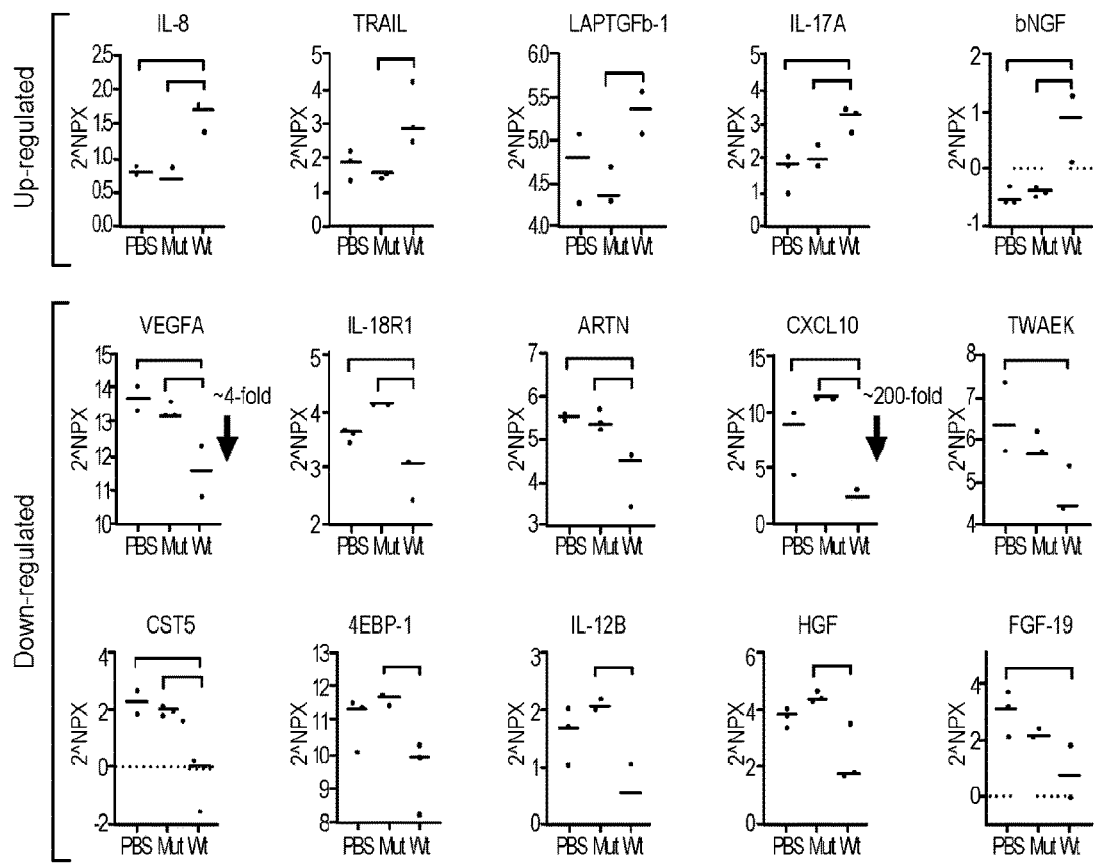

Also, the effect of peptide on cytokine production by BCBL-1 PEL cells in xenograft mouse model was studied. Acsite was collected from NRG mice baring BCBL-1 PELs, which were either treated with wild type MBK50 (Wt) peptide (n=3), control Mut peptide (n=3) or left untreated (n=3) for 20 days. The levels of cytokines in the ascites were measured by Olink technology using inflammatory panel that can detect 92 inflammatory proteins. Data was analyzed with Olink Insights Stat analysis software. PC analysis of 92 proteins expression profiles show close clustering of samples from untreated mice and Mut peptide-treated mice whereas samples from mice treated with Wt peptide were away from the cluster (FIG. 12a). Thus, inflammatory protein expression profile of Wt peptide is distinct from the profile of other groups. Among 92 cytokines in the panel, 15 cytokines were significantly up- or down-regulated (p<0.05 by Annova) in mice treated with wild-type peptide as shown in heat-map (FIG. 12b). On the right panel in (FIG. 12c), 15 cytokine expression levels expressed in NPX units, Olink's arbitrary unit, on log 2 scale were compared between untreated, mutant peptide and Wt peptide-treated groups. Whereas the majority of the expression changes were about 2-fold, VEGFA, angiogenesis factor, (~4-fold) and CXCL10, leukocytes recruiting factor, (~200-fold) were substantially decreased. These results indicate that the peptide may effectively block angiogenesis and leukocyte recruitment, and may be used to block inflammatory responses.

Example 10: MBK Effect on Monocytic Cells

Figure 13A:
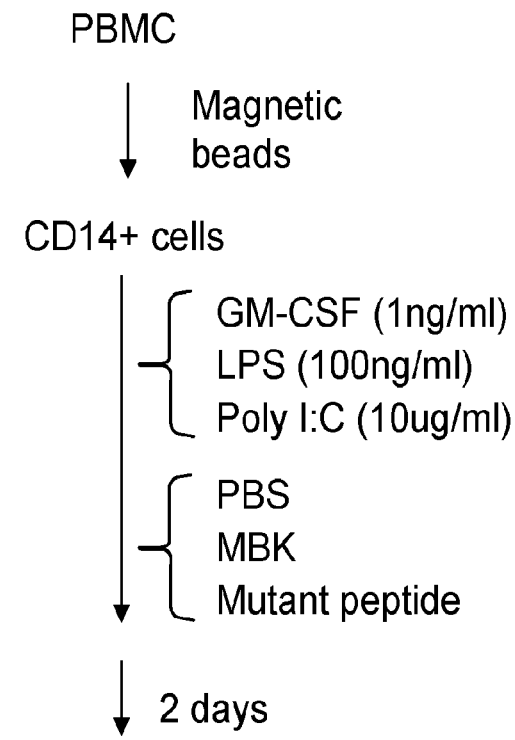
FIG. 13(a) A scheme of the experimental procedure. CD14+ monocytes were prepared with magnetic beads from the PBMC of healthy donors. Cells were washed and cultured at $1 \times 10^6$/ml in a 96 well plate (200 μl/well in triplicates) without or with LPS (100 ng/ml) or poly I:C (10 μg/ml) in the presence of MBK (16 or 32 μM) or mutant peptide (32 μM) for 2 days. Live cells were determined using live/dead staining followed by flow cytometry analysis.
Figure 13B:
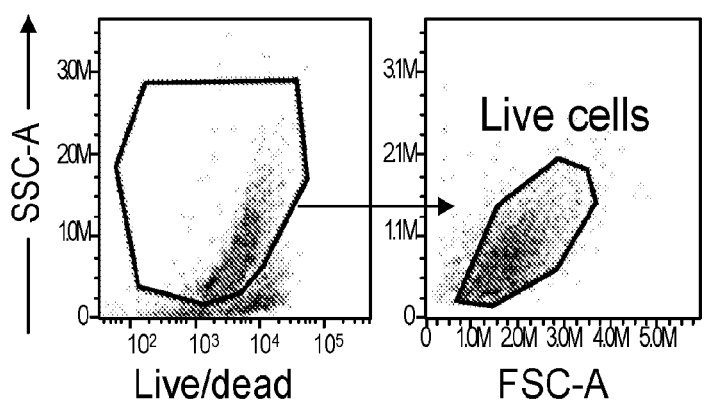
FIG. 13(b) A representative flow profile with the gating strategy for live cells is shown.
Figure 13C:
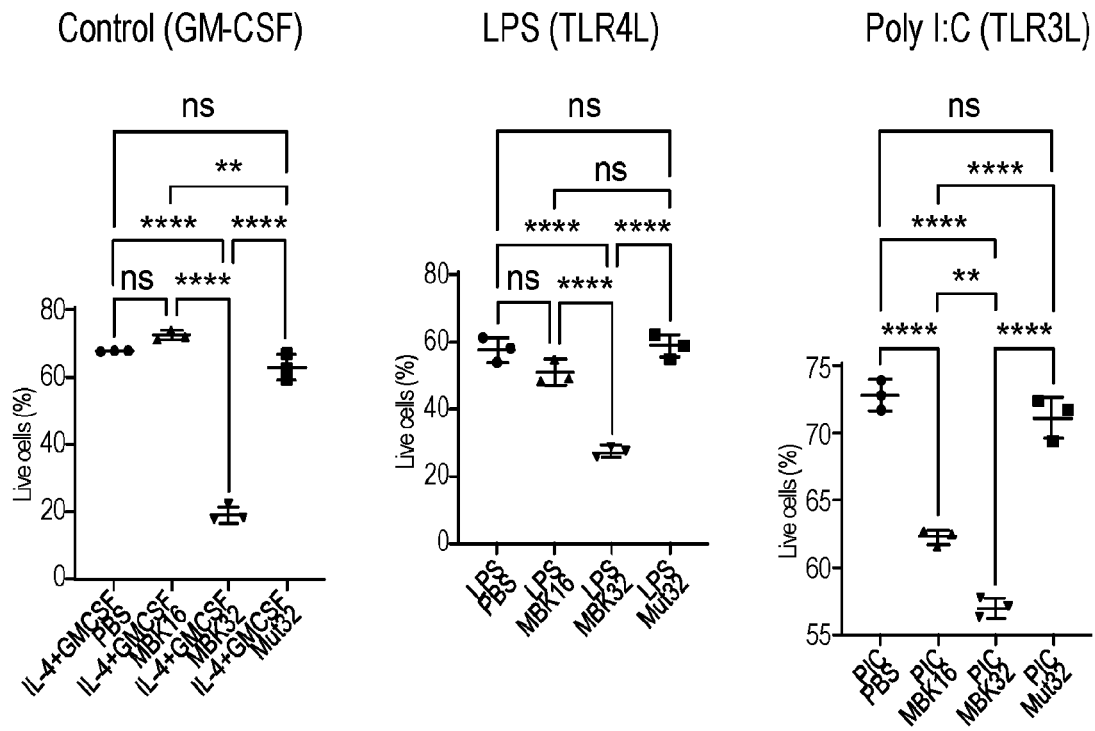
FIG. 13(c) Averages percentage of live cells for each culture condition are shown. $p<0.01$, *$p<0.001$, ****$p<0.0001$ FIG. 14. Effect of MBK50 on CD14+ monocytes.
Figures 14A, 14B:
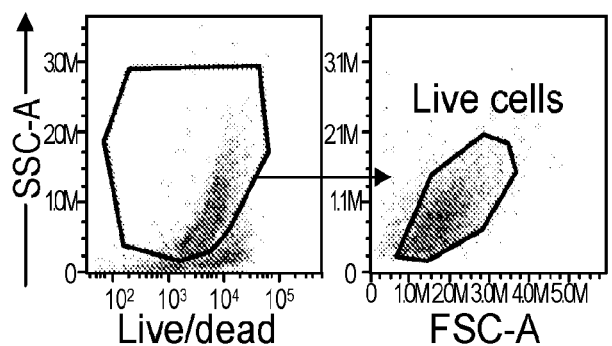
FIG. 14(A) A scheme of the experimental procedure. Monocyte-derived dendritic cells were prepared from magnetic beads sorted CD14+ cells (from PBMC of a healthy donor) after culture for 4 days in the presence of GM-CSF+IL-4 (each 50 ng/ml). Cells were washed and cultured at $1 \times 10^6$/ml in a 96 well plate (200 μl/well in triplicates) without or with LPS (100 ng/ml), poly I:C (10 μg/ml), or sCD40L (1 μg/ml) in the presence of MBK50 (16 or 32 μM) or mutant peptide (32 μM) for 2 days. Live cells were determined using live/dead staining followed by flow cytometry analysis.
FIG. 14(B) A representative flow profile with the gating strategy for live cells is shown.
Figure 14C:
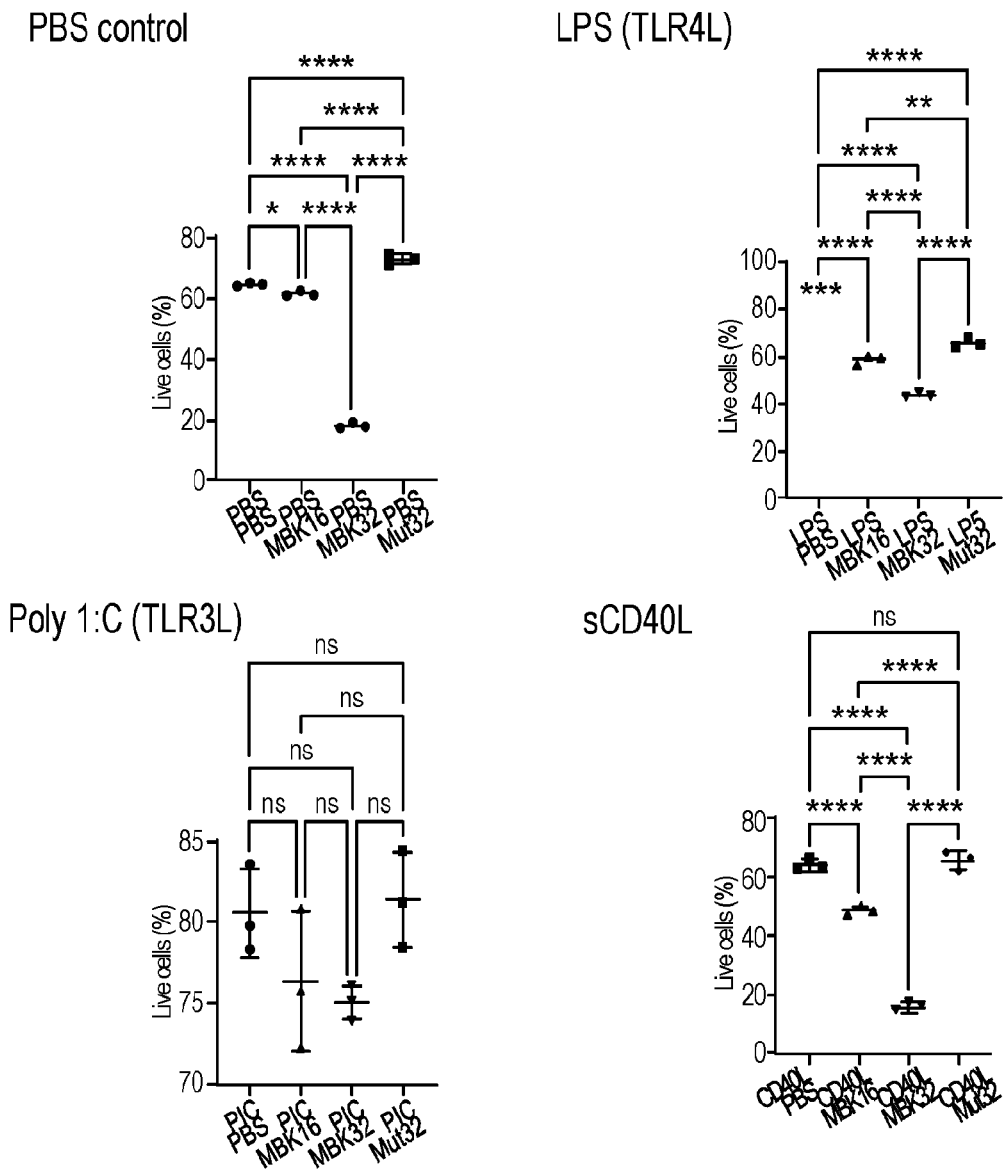
FIG. 14(C) Averages percentage of live cells for each culture condition are shown. *$p<0.05$, $p<0.01$, *$p<0.001$, ****$p<0.0001$ FIG. 15. Representative images of monocyte derived dendritic cells (MDCs) from two human healthy donors after treatment with MBK50, mutant peptide, or PBS for two days in U-bottom 96 well culture. The diameter of the ring approximately corresponds to the cell volume/numbers in each well. Note that MBK50 treated cells are not clumped and are more spread and adhesive compared to the controls suggesting their cell death and/or cell differentiation due to the inhibition of MYC-driven proliferation by MBK50.
Figure 15:
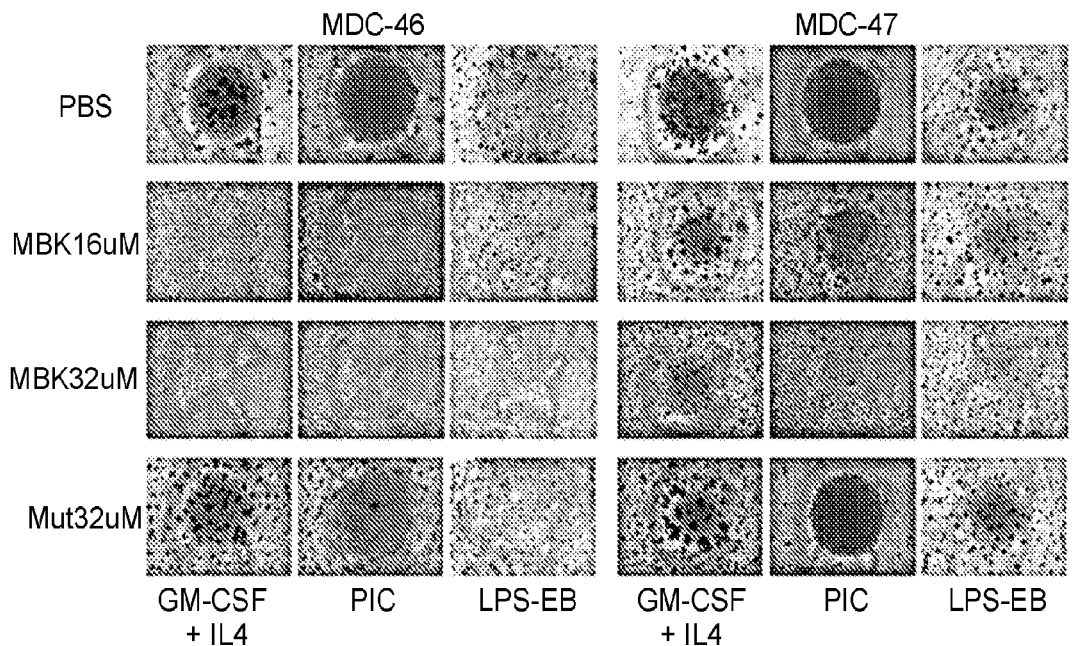

Monocytic cells are important antigen-presenting cells bridging innate and antigen-specific immune responses. To evaluate the effect of MBK on monocytic cells, CD14+ monocytes were prepared with magnetic beads from the PBMC of healthy donors. Cells were washed and cultured at $1 \times 10^6$/ml in a 96 well plate (200 µl/well in triplicates) without or with LPS (100 ng/ml) or poly I:C (10 µg/ml) in the presence of MBK (16 or 32 µM) or mutant peptide (32 µM) for 2 days. Live cells were determined using live/dead staining, followed by flow cytometry analysis. As shown in FIG. 13, the percentage of live cells was significantly reduced in both unstimulated (PBS) and stimulated (LPS, polyIC) conditions after treatment with MBK50 compared to control peptide or PBS control, demonstrating the cell-killing effect of MBK on CD14+ monocytes.

Figure 16A:
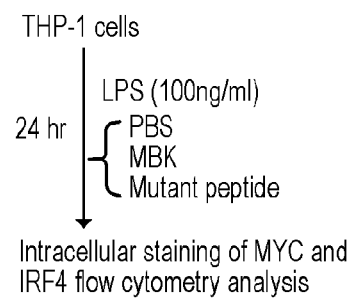
FIG. 16(a) A scheme of the experimental procedure.
Figure 16B:
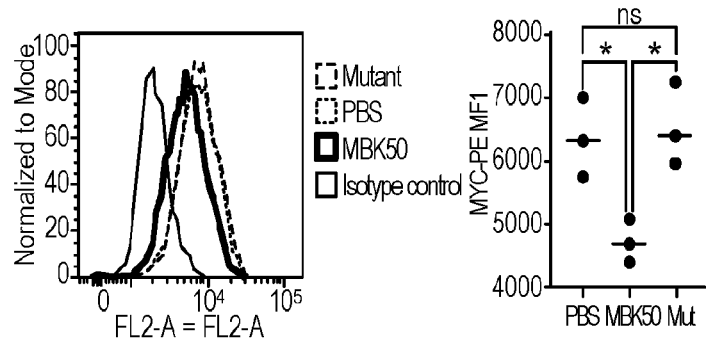
FIG. 16(b) A representative histogram overlay for the MYC expression in THP-1 cells treated with MBK50, mutant control peptide or PBS, with isotype control. The average mean fluorescent intensity (MFI) for MYC expression (n=3) for each treatment is shown in the right panel.
Figure 16C:
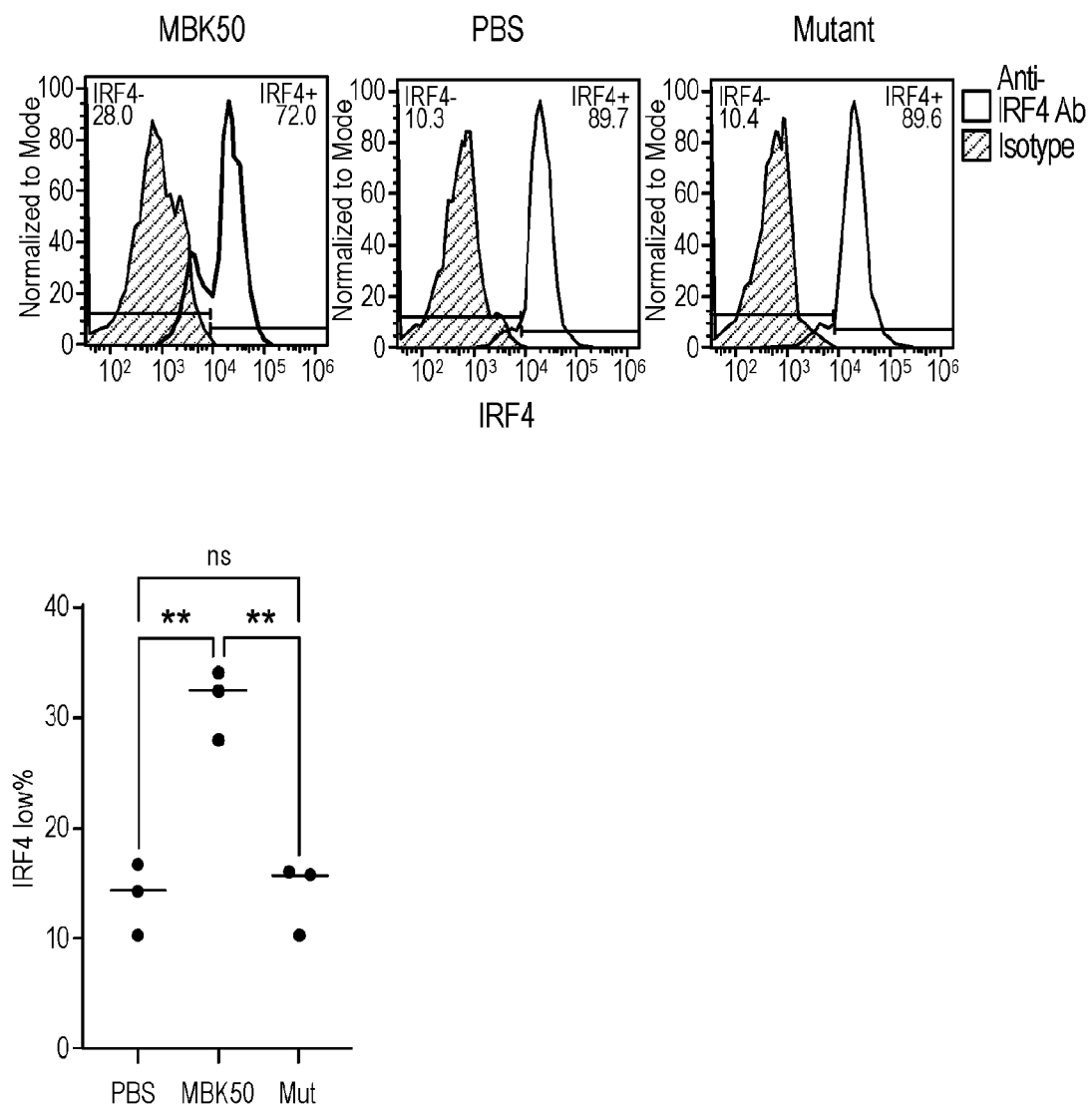
FIG. 16(c) A representative histogram overlay for the IRF4 expression (red) in THP-1 cells treated with MBK50, mutant control peptide, or PBS, with isotype control (blue). The average MFI for IRF4 expression for each treatment is shown in the right panel.

Similar experiments were also performed with monocyte-derived dendritic cells as a model of human dendritic cells. Briefly, Monocyte-derived dendritic cells were prepared from magnetic beads sorted CD14+ cells (from PBMC of a healthy donor) after culture for 4 days in the presence of GM-CSF+IL-4 (each 50 ng/ml). Cells were washed and cultured at $1 \times 10^6$/ml in a 96 well plate (200 µl/well in triplicates) without or with LPS (100 ng/ml), poly I:C (10 µg/ml), or sCD40L (1 µg/ml) in the presence of MBK (16 or 32 µM) or mutant peptide (32 µM) for 2 days. Live cells were determined as shown above using live/dead staining. As shown in FIG. 16, the percentage of live cells was significantly reduced in unstimulated (PBS) as well as stimulated (LPS, sCD40L) conditions after treatment with MBK50 compared to control peptide or PBS control, demonstrating the cell killing effect of MBK on MDCs.

Notably, as shown in FIG. 13, MBK treated MDCs were not clumped and were more spread and adhesive compared to the control groups, indicating potential cell differentiation due to the inhibition of MYC-driven proliferation by MBK.

As shown in FIG. 6, monocytic leukemia cell lines THP-1 and U973 were both sensitive to MBK50-mediated cell killing. MYC is important for monocytic cell proliferation, especially upon LPS stimulation. To demonstrate that MBK50 blocks monocytic cell proliferation by downregulating MYC and IRF4, a direct MYC target gene, monocytic leukemic cell line THP-1 cells were cultured with LPS (100 ng/ml) in the presence of 16 µM of MBK, mutant control, or PBS for 24 hours. MYC and IRF4 expression levels were examined by intracellular staining of MYC and IRF4 with isotype control staining followed by flow cytometry (FIG. 16a). As shown in FIG. 16b, MYC expression in THP-1 cells was significantly reduced upon MBK treatment compared to mutant control peptide or PBS as evident by significantly reduced MFI of MYC. Also, the percentage of THP-1 cells with reduced IRF4 expression was increased by MBK50 treatment compared to mutant control peptide or PBS treatment. These results indicate that MBK50 directly target and downregulate MYC and IRF4 expression in monocytic leukemic cells, inhibiting their MYC-dependent proliferation.

Collectively, these results indicate that MBK50 can be used to inhibit monocytic cell proliferation and function in inflammatory conditions including chronic inflammatory diseases and autoimmune diseases. Also, the data also show that MBK50 can be used to kill monocytic leukemic cells such as acute myeloid leukemia (AML).

Example 11: MBK Interaction with the SWI/SNF Complex

To confirm the basis of VGN50 (a.k.a. MBK50) mechanism of action, the biochemical interaction between VGN50 and SWI/SNF proteins (i.e., VGN50 target molecules), were examined by ELISA-based binding assays using purified 5 individual SWI/SNF components prepared from baculovirus-infected Sf9 cells (FIG. 17a). Increasing concentrations of biotin-conjugated VGN50 or Mut-P were incubated in an ELISA plate coated with each SWI/SNF component, and the bound peptides were detected by HRP-streptavidin (FIG. 17b). The results showed that VGN50 bound to the 5 SWI/SNF components at a concentration as low as 50 nM (FIG. 17c). These results indicate that VGN50 can interact with components of the SWI/SNF complex. These assays can be used to verify MBK/VGN50 variants that possess the ability to suppress MYC activity via the same molecular interaction and mechanism of action.

All patents, patent applications, and other publications, including GenBank Accession Numbers or equivalents, cited in this application are incorporated by reference in the entirety for all purposes.

REFERENCES

1. Dang, C. V., Reddy, E. P., Shokat, K. M. & Soucek, L. Drugging the 'undruggable' cancer targets. Nat Rev Cancer 17, 502-508 (2017).
2. Lau, J. L. & Dunn, M. K. Therapeutic peptides: Historical perspectives, current development trends, and future directions. Bioorg Med Chem 26, 2700-2707 (2018).
3. Beaulieu, M. E. et al. Intrinsic cell-penetrating activity propels Omomyc from proof of concept to viable anti-MYC therapy. Sci Transl Med 11 (2019).
4. Tugyi, R. et al. Partial D-amino acid substitution: Improved enzymatic stability and preserved Ab recognition of a MUC2 epitope peptide. Proc Natl Acad Sci USA 102, 413-418 (2005).

INFORMAL SEQUENCE LISTING

```
MBK50 peptide amino acid sequence
                                      SEQ ID NO: 1
LSSILQGLYQLDT TAT peptide amino acid sequence
                                      SEQ ID NO: 2
GRKKRRQRRRPQ TAT peptide amino acid sequence (modified)
                                      SEQ ID NO: 3
{d-Arg}KKRR{Ornithine}RRR{Beta-Ala}

MYC-inhibiting peptide consensus sequence
(x = any amino acid)
                                      SEQ ID NO: 4
LxxILQ(G/D)LYxLDx
```

What is claimed is:

1. A polypeptide comprising a MYC-inhibiting peptide and a heterologous amino acid sequence, wherein the MYC-inhibiting peptide comprises the amino acid sequence set forth in SEQ ID NO:4, is no more than about 100 amino acids in length, and inhibits MYC activity in a cell.

2. The polypeptide of claim 1, wherein the MYC-inhibiting peptide comprises the amino acid sequence set forth in SEQ ID NO:1.

3. The polypeptide of claim 1, wherein the MYC inhibiting peptide consists of the amino acid sequence set forth in SEQ ID NO:1.

4. The polypeptide of claim 1, comprising one or more D-amino acids.

5. The polypeptide of claim 4, wherein the MYC inhibiting peptide comprises one or more D-amino acids.

6. The polypeptide of claim 1, wherein heterologous amino acid sequence is a TAT peptide.

7. The polypeptide of claim 6, wherein the TAT peptide comprises the amino acid sequence set forth in SEQ ID NO:2 or 3.

8. The polypeptide of claim 6, wherein the TAT peptide comprises one or more D-amino acids.

9. The polypeptide of claim 1, wherein the heterologous peptide is an antibody or an antigen-binding fragment thereof.

10. The polypeptide of claim 9, comprising a TAT peptide, the MYC-inhibiting peptide, and an antibody or an antigen-binding fragment thereof.

11. The polypeptide of claim 9, wherein the antibody is a single chain antibody.

12. The polypeptide of claim 9, wherein the antibody or antigen-binding fragment is humanized.

13. The polypeptide of claim 9, wherein the antibody or antigen-binding fragment specifically binds a cell surface antigen on a MYC-dependent tumor cell.

14. The polypeptide of claim 9, wherein the MYC-inhibiting peptide and the antibody or antigen-binding fragment are connected by a peptide linker comprising one or more protease cleavage sites.

15. The polypeptide of claim 1, wherein the amino acid at position 3 or 13 of SEQ ID NO:4 is different from that in SEQ ID NO: 1.

16. The polypeptide of claim 15, wherein the amino acid at position 3 of SEQ ID NO: 4 is a threonine.

17. The polypeptide of claim 15, wherein the amino acid at position 13 of SEQ ID NO:4 is a serine or glutamic acid.

18. The polypeptide of claim 1, further comprising a nuclear localization signal.

19. The polypeptide of claim 1, comprising a cysteine residue at the C-terminus.

20. The polypeptide of claim 1, comprising a signal peptide at the N-terminus.

21. The polypeptide of claim 1, wherein the cell is a cancer cell.

22. The polypeptide of claim 1, wherein the cell is a B cell or a T cell.

23. A polynucleotide encoding the polypeptide of claim 1.

24. An expression cassette comprising the polynucleotide of claim 23, operably linked to a promoter.

25. A vector comprising the polynucleotide of claim 23.

26. A host cell comprising the polynucleotide of claim 23.

27. A pharmaceutical composition comprising the polypeptide of claim 1 or a polynucleotide encoding the polypeptide and a pharmaceutically acceptable carrier.

28. A method of inhibiting MYC activity in a cell, the method comprising contacting the cell with an effective amount of the polypeptide of claim 1 or a polynucleotide encoding the polypeptide.

29. The method of claim 28, wherein the cell is a cancer cell.

30. The method of claim 28, wherein the cell is a B cell or a T cell.

31. A method of treating an inflammatory condition or an autoimmune disease, comprising administering to a patient in need thereof an effective amount of the polypeptide of claim 1 or a polynucleotide encoding the polypeptide.

32. A method of treating a MYC-dependent cancer in a subject, the method comprising administering to the subject an effective amount of the polypeptide of claim 1 or a polynucleotide encoding the polypeptide.

33. The method of claim 32, wherein the cancer is a primary effusion lymphoma (PEL).

* * * * *

```
SEQUENCE LISTING

<160> NUMBER OF SEQ ID NOS: 12

<210> SEQ ID NO 1
<211> LENGTH: 13
<212> TYPE: PRT
<213> ORGANISM: Human gammaherpesvirus 8

<400> SEQUENCE: 1

Leu Ser Ser Ile Leu Gln Gly Leu Tyr Gln Leu Asp Thr
1               5                   10

<210> SEQ ID NO 2
<211> LENGTH: 12
<212> TYPE: PRT
<213> ORGANISM: Human immunodeficiency virus

<400> SEQUENCE: 2

Gly Arg Lys Lys Arg Arg Gln Arg Arg Pro Gln
1               5                   10

<210> SEQ ID NO 3
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: D-amino acid
<220> FEATURE:
<221> NAME/KEY: MOD_RES
<222> LOCATION: (6)..(6)
<223> OTHER INFORMATION: Ornithine
<220> FEATURE:
<221> NAME/KEY: MOD_RES
<222> LOCATION: (10)..(10)
<223> OTHER INFORMATION: Beta-Ala
```

```
<400> SEQUENCE: 3

Arg Lys Lys Arg Arg Xaa Arg Arg Arg Ala
1               5                   10

<210> SEQ ID NO 4
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(3)
<223> OTHER INFORMATION: Any amino acid
<220> FEATURE:
<221> NAME/KEY: MOD_RES
<222> LOCATION: (7)..(7)
<223> OTHER INFORMATION: G or D
<220> FEATURE:
<221> NAME/KEY: MOD_RES
<222> LOCATION: (10)..(10)
<223> OTHER INFORMATION: Any amino acid
<220> FEATURE:
<221> NAME/KEY: MOD_RES
<222> LOCATION: (13)..(13)
<223> OTHER INFORMATION: Any amino acid

<400> SEQUENCE: 4

Leu Xaa Xaa Ile Leu Gln Xaa Leu Tyr Xaa Leu Asp Xaa
1               5                   10

<210> SEQ ID NO 5
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 5

His His His His His His
1               5

<210> SEQ ID NO 6
<211> LENGTH: 22
<212> TYPE: PRT
<213> ORGANISM: Human gammaherpesvirus 8

<400> SEQUENCE: 6

Thr Asp Asp Ala Leu Leu Ser Ser Ile Leu Gln Gly Leu Tyr Gln Leu
1               5                   10                  15

Asp Thr Pro Pro Pro Leu
            20

<210> SEQ ID NO 7
<211> LENGTH: 15
<212> TYPE: PRT
<213> ORGANISM: Unknown
<220> FEATURE:
<223> OTHER INFORMATION: Description of Unknown:
      LysR Bacteria TF sequence

<400> SEQUENCE: 7

Leu Lys Ala Gln Leu Pro Thr Ile Leu Gln Gly Leu Tyr Gln Leu
1               5                   10                  15

<210> SEQ ID NO 8
```

```
<211> LENGTH: 20
<212> TYPE: PRT
<213> ORGANISM: Saimiriine gammaherpesvirus 2

<400> SEQUENCE: 8

Thr Asp Asp Asn Ile Leu Ala Ser Ile Leu Gln Asp Leu Tyr Asp Leu
1               5                   10                  15

Pro Ala Pro Pro
            20

<210> SEQ ID NO 9
<211> LENGTH: 19
<212> TYPE: PRT
<213> ORGANISM: Macacine gammaherpesvirus 12

<400> SEQUENCE: 9

Thr Asp Asp Asp Met Leu Ala Ala Ile Leu Gln Asp Leu Tyr Gly Leu
1               5                   10                  15

Gln Ser Pro

<210> SEQ ID NO 10
<211> LENGTH: 18
<212> TYPE: PRT
<213> ORGANISM: Bovine gammaherpesvirus 4

<400> SEQUENCE: 10

Glu Asp Ala Tyr Leu Glu Leu Ile Leu Gln Gly Leu Tyr His Leu Asp
1               5                   10                  15

Glu Pro

<210> SEQ ID NO 11
<211> LENGTH: 19
<212> TYPE: PRT
<213> ORGANISM: Macacine gammaherpesvirus 8

<400> SEQUENCE: 11

Asp Asp Glu Leu Leu Ser Thr Ile Leu Gln Gly Leu Tyr Gln Leu Asp
1               5                   10                  15

Glu Pro Pro

<210> SEQ ID NO 12
<211> LENGTH: 19
<212> TYPE: PRT
<213> ORGANISM: Unknown
<220> FEATURE:
<223> OTHER INFORMATION: Description of Unknown:
      Colobine gammaherpesvirus 1 sequence

<400> SEQUENCE: 12

Asp Glu Asp Leu Leu Ser Ala Ile Leu Gln Gly Leu Tyr Gln Leu Asp
1               5                   10                  15

Glu Pro Pro
```